US009566997B2

(12) United States Patent
Fujiwara et al.

(10) Patent No.: US 9,566,997 B2
(45) Date of Patent: Feb. 14, 2017

(54) SUPPORT APPARATUS FOR STEERING COLUMN AND MANUFACTURING METHOD THEREOF

(75) Inventors: Takeshi Fujiwara, Maebashi (JP); Kiyoshi Sadakata, Maebashi (JP); Toru Segawa, Maebashi (JP); Takahiro Minamigata, Maebashi (JP)

(73) Assignee: NSK, Ltd., Tokyo (JP)

( * ) Notice: Subject to any disclaimer, the term of this patent is extended or adjusted under 35 U.S.C. 154(b) by 654 days.

(21) Appl. No.: 13/574,543

(22) PCT Filed: Apr. 20, 2012

(86) PCT No.: PCT/JP2012/060729
§ 371 (c)(1),
(2), (4) Date: Jan. 16, 2013

(87) PCT Pub. No.: WO2012/144603
PCT Pub. Date: Oct. 26, 2012

(65) Prior Publication Data
US 2016/0185380 A1 Jun. 30, 2016

(30) Foreign Application Priority Data

Apr. 22, 2011 (JP) ................................. 2011-095799
May 11, 2011 (JP) ................................. 2011-105847
May 24, 2011 (JP) ................................. 2011-115513

(51) Int. Cl.
B62D 1/19 (2006.01)
(52) U.S. Cl.
CPC ..................... B62D 1/195 (2013.01)

(58) Field of Classification Search
CPC ............ B62D 1/19; B62D 1/192; B62D 1/195
See application file for complete search history.

(56) References Cited

U.S. PATENT DOCUMENTS 9,114,828 B2 *  8/2015  Fujiwara ................ B62D 1/185
9,139,220 B2 *  9/2015  Hong ..................... B62D 1/195
(Continued)

FOREIGN PATENT DOCUMENTS

GB        1322234 A   *  7/1973  ............ B62D 1/195
JP      51-121929 U     10/1976
(Continued)

OTHER PUBLICATIONS

International Search Report dated Jul. 24, 2012 with partial English translation (four (4) pages).
(Continued)

Primary Examiner — James English
(74) Attorney, Agent, or Firm — Crowell & Moring LLP

(57) ABSTRACT

Construction is achieved that makes it possible to stably and sufficiently increase support rigidity of a column-side bracket with respect to a vehicle-side bracket. The vehicle-side bracket and a locking capsule that is fastened to the column-side bracket are connected with synthetic resin locking pins so as to be able to break away during a secondary collision. Concave sections are formed on the bottom surface of the vehicle-side bracket, and together with one end being connected to small through holes in which the locking pins are located, the other end is open to the external space side. Part of the synthetic resin of the locking pins is exposed to the external space side through these concave sections.

6 Claims, 33 Drawing Sheets

(56) References Cited

U.S. PATENT DOCUMENTS

| | | | |
|---|---|---|---|
| 2011/0036198 A1 | 2/2011 | Minamigata | |
| 2012/0112443 A1* | 5/2012 | Arakawa | B62D 1/195 280/777 |
| 2012/0144951 A1* | 6/2012 | Minamigata | B62D 1/195 74/492 |
| 2012/0169035 A1* | 7/2012 | Minamigata | B62D 1/195 280/777 |
| 2012/0186384 A1* | 7/2012 | Minamigata | B62D 1/195 74/492 |
| 2012/0187669 A1* | 7/2012 | Minamigata | B62D 1/195 280/777 |
| 2012/0240711 A1* | 9/2012 | Minamigata | B62D 1/195 74/493 |
| 2012/0291585 A1* | 11/2012 | Minamigata | B62D 1/195 74/493 |
| 2015/0375774 A1* | 12/2015 | Okada | F16M 13/02 248/548 |

FOREIGN PATENT DOCUMENTS

| | | |
|---|---|---|
| JP | 52-16129 U | 2/1977 |
| JP | 53-26030 U | 3/1978 |
| JP | 2007-69821 A | 3/2007 |
| JP | 2008-100597 A | 5/2008 |
| JP | 2010-13010 A | 1/2010 |
| WO | WO 2005/035331 A1 | 4/2005 |

OTHER PUBLICATIONS

Mechanical English translation of document B1 (JP 2010-13010 A) previously filed on Jul. 20, 2012 (sixteen (16) pages).

Mechanical English translation of document B3 (JP 2007-69821 A) previously filed on Jul. 20, 2012 (eighteen (18) pages).

Mechanical English translation of document B4 (JP 2008-100597 A) previously filed on Jul. 20, 2012 (eighteen (18) pages).

* cited by examiner (A)

(B)

(A)

(B)

Prior Art

Prior Art

Prior Art

SUPPORT APPARATUS FOR STEERING COLUMN AND MANUFACTURING METHOD THEREOF

TECHNICAL FIELD

The present invention relates to a support apparatus for a steering column of a steering apparatus for an automobile that applies a steering angle to the front wheels based on operation of a steering wheel.

BACKGROUND ART

As illustrated in FIG. 42, a steering apparatus for an automobile applies a steering angle to the front wheels by transmitting rotation of the steering wheel 1 to an input shaft 3 of a steering gear unit 2, and pushing or pulling a pair of left and right tie rods 4 as the input shaft 3 rotates. The steering wheel 1 is inserted in the axial direction through a cylindrical shaped steering column 6, and is supported by and fastened to this steering column 6 so as to be able to rotate freely. The front-end section of a steering shaft 5 is connected to the rear-end section of an intermediate shaft 8 by way of a universal joint 7, and the front end of this intermediate shaft 8 is connected to the input shaft 3 by way of a separate universal joint 9. The intermediate shaft 8 is constructed so as to be able to transmit torque, as well as to be able to contract along the entire length due to an impact load, so that during a primary collision of collision accident when an automobile collides with another automobile or the like, regardless of displacement toward the rear of the steering gear unit 2, it is prevented that the steering wheel 1 displaces toward the rear by way of the steering shaft 5 so as to shove or press against the body of the operator.

During a collision accident, a secondary collision occurs after the primary collision when the body of the operator collides with the steering wheel 1. In order to lessen the impact that is applied to the body of the operator during this secondary collision, the steering column 6 is supported by way of a locking capsule 11 and bolts or studs by a vehicle-side bracket 10 that is fastened to the vehicle so that when a large force is applied in the forward direction, the steering column 6 drops away from the vehicle-side bracket 10. Construction for supporting this steering column 6 by the vehicle-side bracket 10 is conventionally known. An example of conventional support construction is disclosed in JP2010-13010(A), and will be explained using FIG. 43 to FIG. 45.

In the construction illustrated in FIG. 43, a tilt mechanism is assembled which allows height adjustment of the steering wheel 1 (see FIG. 42) that is fastened to the portion on the rear-end section of the steering shaft 5 that protruded toward the rear of the steering column 6a. Therefore, the middle section of the steering column 6a is supported by a column-side bracket 13 by way of an adjustment rod 14, and this column-side bracket 13 is supported by the vehicle-side bracket 10 (see FIG. 42) so as to drop away when a large force is applied in the forward direction as illustrated by the arrow in FIG. 43. The column-side bracket 13 is integrally formed by bending a metal plate such as steel plate and comprises a pair of left and right support plate sections 15 that are provided in the up-down direction, a pair of installation plate sections 16 that are provided so as to protrude toward both sides of the steering column 6a from the top end section of the support plate sections 15, and a connecting section (omitted from the figures) that connects together the bottom end edges of the pair of support plate sections 15.

Locking notches 17 are provided in the pair of installation plate sections 16 so as to be open on the rear-end edges of the installation plate sections 16. The shape of these locking notches 17 is a substantially trapezoidal shape wherein the width dimension becomes smaller going toward the front (bottom side). Locking capsules 11 are assembled on the inside of these locking notches 17. These locking capsules 11 are formed by injection molding using synthetic resin, or die-casting using a light alloy, and each locking capsule 17 has locking grooves 18 on the left and right sides. The space between the bottoms of the grooves of these locking grooves 18, in order to match the width of the locking notches 17, becomes narrow going toward the front. In other words, the locking grooves 18 become deeper toward the front.

These locking capsules 11 each are supported by one of the pair of installation plate sections 16 by engaging the locking grooves 18 thereof with portions of the installation plate section 16 located on both sides of the locking notches 17. With small though holes (omitted in the drawings) that are formed in the portions of the installation plate section 16 located on both sides of the locking notches 17 aligned with small through holes 19 that are formed in the locking capsules 11, synthetic resin locking pins that are connecting members are formed by injection molding so as to span through these small through holes. In this state, the pair of locking capsules 11 are supported by the pair of installation plate sections 16 so that they drop away toward the rear only when a large impact load is applied.

As illustrated in FIG. 42, by inserting bolts or studs 12 from the bottom through a through hole 20 that is formed in the center section of the locking capsules 11, the pair of locking capsules 11 are supported by and fastened to the vehicle-side bracket 10. In order for this, screw holes for screwing the bolts or studs 12 into are formed directly in the vehicle-side bracket 10 or nuts are fastened by welding or the like to surface thereof. Each pair of a locking capsule 11 and installation plate section 16 are joined together with somewhat large force and rigidity by engagement of the portions located on both sides of the locking notches 17 and the locking grooves 18, and by the synthetic resin locking pins that span through the small through holes 19. Therefore, during normal operation, the column-side bracket 13 is firmly supported by the vehicle body.

When a strong force in the forward direction is applied to the steering column 6a from the steering wheel 1 during a secondary collision that accompanies a collision accident, the locking pins inside the small through holes 19 shear and the pair of locking capsules 11 come out toward the rear from the pair of locking notches 17. In other words, the installation plate sections 16 displace in the forward direction with the locking capsules remaining in position as is. This allows the steering wheel 1 to displace in the forward direction, which lessens the impact that is applied to the body of the operator who collides with the steering wheel 1.

In the case of the construction illustrated in FIG. 43 to FIG. 45, the column-side bracket 14 is supported at two locations on both the left and right side by the vehicle-side bracket 10. In the case of this construction, releasing the engagement of the pair of left and right engagement section at the same time during a secondary collision is important from the aspect of allowing the steering wheel 1 to displace in smoothly in the forward direction with no inclination. However, tuning in order that engagement of these engagement sections is released at the same time is affected by resistance such as the friction resistance and shear resistance against the release of these engagement sections, and is also affected by unbalance on the left and right of the inertia mass of the portion that displaces in the forward direction together with the steering column 6a, so this tuning work takes time. JP51-121929(A) discloses a structure in which an engagement section between the vehicle-side bracket and locking capsule is provided at only one location in the center section in the width direction in order that the steering column breaks stably away in the forward direction during a secondary collision.

In the case of comprising a tilt mechanism and/or a telescoping mechanism, in order to increase the holding strength for supporting the steering wheel 1 in the adjusted position, JP2007-69821(A) and JP2008-100597(A) disclose a structure in which a friction plate unit is held between the inside surfaces of the pair of support plate sections 15 and the outside surfaces of a pair of supported plate sections on the steering column 6a side in order to increase the friction surface area between the surfaces. More specifically, this friction plate unit comprises one or more first friction plates in which long holes are formed that are aligned with long holes in the up-down direction that are formed in the support plate sections 15 in order for the tilt mechanism, and one or more second friction plates in which long holes are formed that are aligned with long holes in the forward-backward that are formed in the supported plate section on the steering column 6a side for the telescoping mechanism, with these friction plates overlapping each other.

RELATED LITERATURE

Patent Literature

[Patent Literature 1] JP2010-13010(A)
[Patent Literature 2] JP51-121929(U)
[Patent Literature 3] JP2007-69821(A)
[Patent Literature 4] JP2008-100597(A)

SUMMARY OF THE INVENTION

Problem to be Solved by the Invention

The object of the present invention is to provide a support apparatus for a steering column that is capable of stabilizing and sufficiently increasing the support rigidity of supporting a column-side bracket by a vehicle-side bracket, and the manufacturing method for that support apparatus.

Means for Solving the Problems

The support apparatus for a steering column of the present invention comprises a column-side bracket, a vehicle-side bracket, a locking capsule and a plurality of connecting members.

The column-side bracket has a top surface. The column-side bracket is supported by a steering column for supporting a steering shaft on the inside thereof so as to be able to rotate freely, and displaces in the forward direction together with the steering column during a secondary collision.

The vehicle-side bracket has: a bottom surface that comes in contact with or closely faces the top surface, a locking notch that extends in the axial direction of the steering column, and a plurality of fixed side volume sections that are provided on a perimeter edge section around the locking notch. The vehicle-side bracket is supported by and fastened to the vehicle body side and does not displace in the forward direction even during a secondary collision.

The locking capsule is locked in the locking notch. The locking capsule has: end sections on both ends in the width direction that are located on the top side of the perimeter edge section of the vehicle-side bracket, and a plurality of displacing side volume sections that are located so as to be aligned with the fixed side volume sections. The locking capsule is fastened to the column-side bracket and displaces in the forward direction together with the column-side bracket during a secondary collision.

The plurality of connecting members are made of synthetic resin that spans between the fixed side volume sections and the displacing side volume section, and shear off due to an impact load that is applied during a secondary collision.

With the support apparatus for a steering column of the present invention, constructed as described above, by holding the perimeter edge section of the vehicle-side bracket by the top surface of the column-side bracket and both end sections in the width direction of the locking capsule, the column-side bracket is supported by the vehicle-side bracket so as to be able to break away in the forward direction due to an impact load that is applied during a secondary collision.

Particularly, the support apparatus for a steering column of the present invention further comprises concave sections that are formed on at least one of the bottom surface of the vehicle-side bracket and the top surface of the column-side bracket, such that these concave sections extend on a portion where the bottom surface of the vehicle-side bracket faces the top surface of the column-side bracket, and together with one end thereof connecting to the fixed side volume sections, the other end thereof is open to an external space side, and part of the synthetic resin enters into these concave sections.

Preferably, synthetic resin that enters the concave sections is exposed to the external space side.

Preferably, at least part of the fixed side volume sections are notch sections that are open on the inner edge of the locking notch, and part of the synthetic resin that is fed to the notch sections for forming the connecting members enters between the inner edge of the locking notch and the portion of the locking capsule that face the inner edge of the locking notch.

Preferably, the support apparatus for a steering column further comprises at least two supporting plates that are made of a metal plate having elasticity and that are held in at least two locations between the bottom surface of the vehicle-side bracket and the top surface of the column-side bracket that are separated in the width direction, in a state where the dimension in the thickness direction is elastically contracted.

Preferably, the supporting plates are connected by connecting sections on the front-end sections and the rear-end section so as to have integrated construction.

The manufacturing method for the support apparatus for a steering column of the present invention is a method for obtaining the support apparatus for a steering column of the present invention described above, and together with pressing blocking tools against a joining section of the bottom surface of the vehicle-side bracket and the top surface of the column-side bracket and blocking the openings on the external space side of the concave sections, at least one of the brackets is elastically deformed in a direction that separates the top surface of the column-side bracket and the bottom surface of the vehicle-side bracket, and in this state synthetic resin is injected into the displacing side volume sections and the fixed side volume sections, after which the blocking tool is moved out of the way and the part of this synthetic resin is elastically held between the bottom surface of the vehicle-side bracket and the top surface of the column-side bracket.

Effect of the Invention

With the support apparatus for a steering column of the present invention constructed as described above, it is possible to stably and sufficiently increase the support rigidity of the column-side bracket with respect to the vehicle-side bracket.

Moreover, in the preferred aspect of the present invention, part of the synthetic resin of the connecting members is exposed to the external space side by way of convex sections. In case that this synthetic resin is exposed to the external space side, at least in or near the convex sections, part of the synthetic resin penetrates between the surfaces of the vehicle-side bracket and column-side bracket that face each other, so it is possible to keep these brackets from displacing due to minute spaces that exist between the surfaces that face each other. Particularly, it is possible to visually check whether or not part of the synthetic resin is exposed to the external space side through the convex sections, so it is possible to check whether or not synthetic resin has penetrated in between the bottom surface of the vehicle-side bracket and the top surface of the column-side bracket, and it is possible to stably maintain the support rigidity. Furthermore, by providing convex sections, it is possible to lengthen the space of the synthetic resin that exists in both end sections in the width direction of the bracket, so it becomes easier to maintain support rigidity.

Moreover, in the preferred aspect of the present invention, supporting plates that are held in at least two locations that are separated in the width direction provide support between the bottom surface of the vehicle-side bracket and the bottom surface of the column-side bracket, so it is possible to sufficiently maintain rigidity of the connecting section between these brackets regardless of whether there is a space in between these brackets.

Furthermore, with the manufacturing method for the support apparatus for a steering column of the present invention, it is possible for the synthetic resin to more completely penetrate into the minute space, and particularly, the synthetic resin can sufficiently penetrate to the portions separated from the convex sections. When a blocking tool is move away and the part of the synthetic resin is elastically held between the bottom surface of the vehicle-side bracket and the top surface of the column-side bracket, it is possible to sufficiently increase the rigidity (make it difficult for displacement to occur) of the connecting section between these brackets.

MODES FOR CARRYING OUT THE INVENTION

Embodiment 1

Example 1

Figure 44:
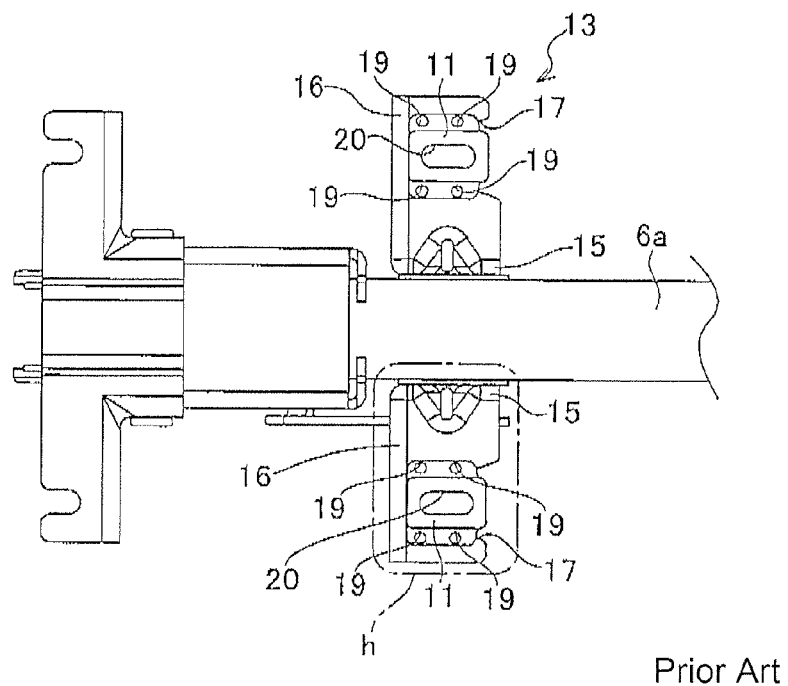
FIG. 44 is a top view illustrating the left portion in FIG. 43 as seen from above.
Figure 45:
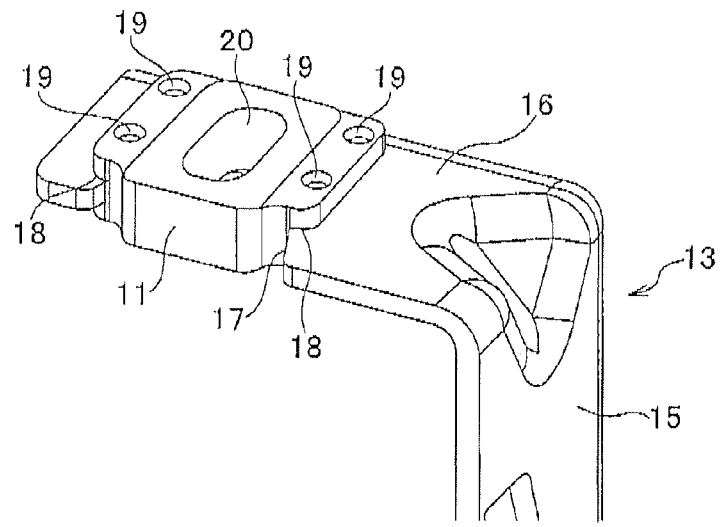
FIG. 45 is a perspective view illustrating part h in FIG. 44 as seen from above the center section in the width direction.

FIG. 1 to FIG. 8 illustrate a first example and a variation of that example of a first embodiment of the present invention. In this example, an engagement section between the vehicle-side bracket 10a and locking capsule 11a (11c) is provided at only one location in the center section in the width direction. In this example, both a tilt mechanism for adjusting the up-down position of the steering wheel 1 (see FIG. 44) and a telescoping mechanism for adjusting the forward-backward position are provided. In order to construct the telescoping mechanism, a steering column having a telescope shape wherein the rear section of an inner column 21 on the front side fits inside the front section of an outer column 22 on the rear side so as to be able to expand and contract along the entire length is used as the steering column 6b. A steering shaft 5a is supported on the inner diameter side of the steering column 6b so as to be able to rotate freely.

By a male spline section that is provided on the rear section of a circular rod shaped inner shaft that is located on the front side engaging with a female spline section that is provided on the front section of a cylindrical shaped outer shaft 23 that is located on the rear side with a spline fit, the steering shaft 5a is able to transmit torque and is able to expand and contract. The rear-end section of the outer shaft 23 protrudes toward the rear further than the opening on the rear end of the outer column 22 and is supported on the inner-diameter side of the outer column 22 by a bearing such as a single-row deep groove type ball bearing 24 that is able to support both a radial load and a thrust load such that only rotation is possible. The steering wheel 1 is supported by and fastened to the rear-end section of the outer shaft 23. When adjusting the forward-backward position of the steering wheel 1, the outer column 22 displaces in the forward-backward direction together with the outer shaft 23, an the steering shaft 5a and steering column 6b expands or contracts.

Moreover, a housing 25 for housing a reduction gear and the like of an electric power steering apparatus is connected and fastened to the front-end section of the inner column 21 of the steering column 6b. An electric motor 26, which is the auxiliary power source of the electric power steering apparatus, and a controller 27 for controlling the flow of electricity to this electric motor 26 are supported by and fastened to the top surface of the housing 25. In order to construct the tilting mechanism, the housing 25 is supported by the vehicle body so as to be able to pivot around a horizontal shaft. More specifically, a support cylinder 28 that is arranged in the left-right direction is provided on the upper front end of the housing 25, and the front-end section of the steering column 6b is supported by the vehicle body by a horizontal shaft such as a bolt that is inserted through a center hole 29 in this support cylinder 28 so as to be able to pivot in a direction to raise or lower the rear section of the steering column 6b.

The inner diameter of the front half section of the outer column 22 that constitutes the center section and rear section of the steering column 6b is able to elastically expand or contract. In order for this, a slit 30 is formed in the axial direction on the bottom surface of the outer column 22. The front-end section of this slit 30 is open on the front-end edge of the outer column 22 or in through hole 31 in the circumferential direction that is formed in the portion near the front end of the outer column 22 except for the top-end section. A pair of supported plate sections 32 that are thick flat plates is provided on both sides in the width direction of the slit 30. These supported plate section 32 displace together with the outer column 22 when adjusting the position of the steering wheel, 1 and function as a displacement-side bracket.

In this example, the pair of supported plate sections 32 is supported by the column-side bracket 13a so that up-down position and forward-backward position can be adjusted. This column-side bracket 13a is supported by the vehicle body during normal operation, however, due to the impact of a secondary collision during a collision accident, the column-side bracket 13a breaks away toward the front, which allows displacement in the forward direction of the outer column 22. In order for this, the column-side bracket 13a is supported by the vehicle-side bracket 10a so as to be able to break away in the forward direction due to an impact load that is applied during a secondary collision.

The adjustment section of the tilt mechanism and telescoping mechanism is such that the pair of supported plate sections 32 are held by a pair of left and right support plate sections 33 of the column-side bracket 13a. Partial arc shaped long holes 34 in the up-down direction that are centered around the horizontal shaft that supports the support cylinder 28 to the vehicle body are formed in the support plate sections 33, and long holes 35 in the forward-backward direction that are long in the axial direction of the outer column 22 are formed in the pair of supported plate sections 32. An adjustment rod 14a is inserted through these long holes 34, 35. The head section 36 that is provided on the base end section (right end section in FIG. 2) of the adjustment rod 14a fits in the long hole in the up-down direction that is formed in one of the support plate sections 33 (right support plate section in FIG. 2) such that only displacement along the long hole in the up-down direction is possible, and rotation is prevented. On the other hand, a cam apparatus 40 comprising a driving cam 38 and a driven cam 39 is provided between a nut 37 that is screwed onto the tip end section (left end section in FIG. 2) of the adjustment rod 14a and the outside surface of the other support plate section 33 (left support plate section in FIG. 2). The driving cam 38 can be rotated and driven by an adjustment lever 41.

By rotating the adjustment lever 41 in a specified direction (downward) when adjusting the position of the steering wheel 1, the driving cam 38 rotates, and causes the dimension in axial direction of the cam apparatus 40 to decrease. The space between the inside surfaces of the driven cam 39 and the head section 36 that face each other is increased, and the restraining force of the pair of support plate sections 33 for holding the pair of supported plate sections 32 is released. At the same time, the inner diameter of the portion on the front section of the outer column 22 in which the rear section of the inner column 21 fits is elastically expanded, which causes the surface pressure that acts on the area of contact between the inner circumferential surface on the front section of the outer column 22 and the outer circumferential surface of the rear section of the inner column 21 to decrease. In this state, it is possible to adjust the up-down position and the forward-backward position of the steering wheel 1 within a range that the adjustment rod 14a is able to displace between the long holes 34 in the up-down direction and the long holes 35 in the forward-backward direction.

After the steering wheel 1 has been moved to a desired position, by rotating the adjustment lever 41 in the opposite direction (upward) from the specified direction, the dimension in the axial direction of the cam apparatus 40 expands. The space between the inside surfaces of the driven cam 39 and the head section 36 that face each other is decreased, causing the pair of supported plate sections 32 to be firmly held by the pair of support plate sections 33. At the same time, the inner diameter of the portion on the front section of the outer column 22 in which the rear section of the inner column 21 fits elastically decreases, and the surface pressure that acts at the area of contact between the inner circumfer-ential surface of the front section of the outer column 22 and the outer circumferential surface of the rear section of the inner column 21 increases. In this state, the up-down position and the forward-backward position of the steering wheel 1 are supported in the adjusted positions.

In the case of this example, in order to increase the holding force for keeping the steering wheel 1 in the adjusted position, friction units 42 are held between the inside surfaces of the pair of support plate sections 33 and the outside surfaces of the pair of supported plate sections 32. One pair of friction plate units 42 has one or a plurality of first friction plates in which a long hole is formed so as to be aligned with the long holes 34 in the up-down direction, and one or a plurality of second friction plates in which a long hole is formed so as to be aligned with the long holes 35 in the forward-backward direction, and these friction plate units 42 having the function of increasing the holding force.

Figure 9:
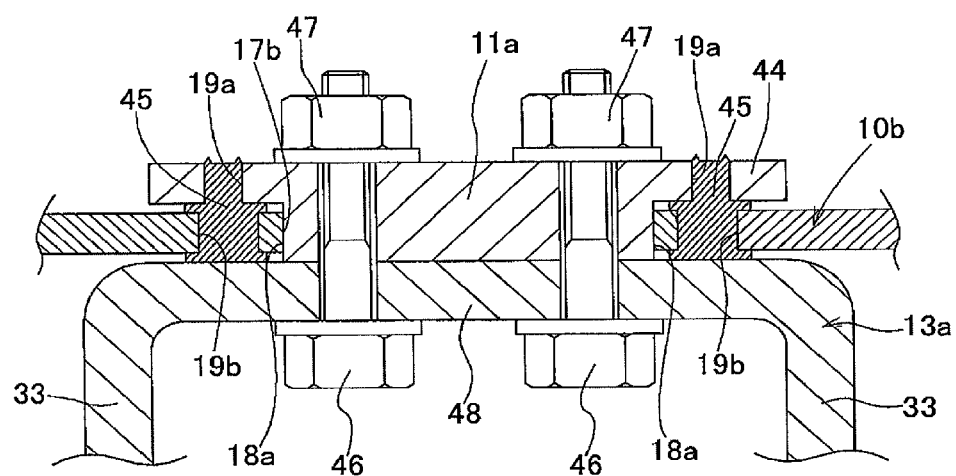
FIG. 9 illustrates a first reference example, and corresponds to an enlarged cross-sectional view of section c-c in FIG. 3.
Figure 10:
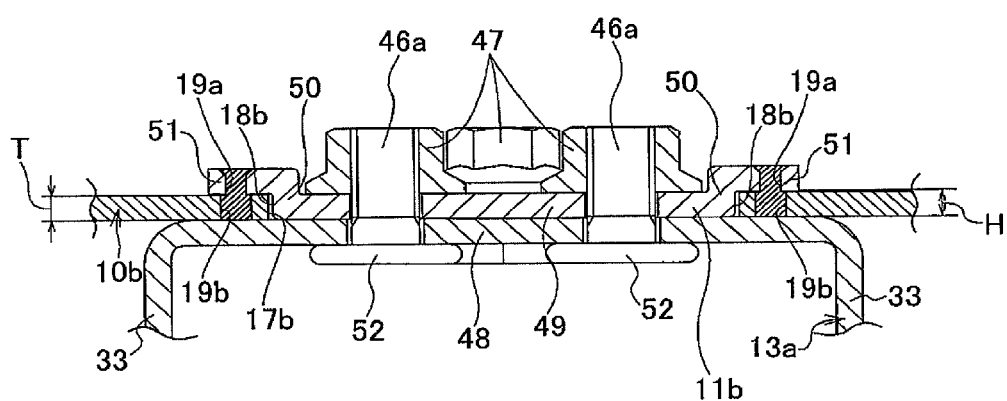
FIG. 10 is a drawing similar to FIG. 9, and illustrates a second reference example.

Furthermore, the column-side bracket 13a is supported by the vehicle-side bracket 10a so that it breaks away in the forward direction due to an impact load of a secondary collision, but does not drop down even as the secondary collision progresses. The vehicle-side bracket 10a is supported by and fastened to the vehicle side, and does not displace in the forward direction even during a secondary collision, and is formed by using a press to perform punching and bending of a metal plate such as steel plate having sufficient strength and rigidity. By bending both the left and right edge sections and rear end edge section downward, the bending rigidity of this kind of vehicle-side bracket 10a is improved, a locking notch 17a that is open on the edge of the front end is formed in the center section in the width direction, and a pair of installation holes 43 are formed in the rear section on both the left and right sides of the locking notch 17a. The locking notch 17a is formed up to near the rear-end section of the vehicle-side bracket 10a that is covered by the locking capsule 11a. This kind of vehicle-side bracket 10a is supported by and fastened to the vehicle body by bolts or studs that are inserted through the pair of installation holes 43, The column-side bracket 13a is connected to vehicle-side bracket 10a as described above by way of a locking capsule so as to be able to break away toward the front during a secondary collision. The inventors have previously proposed construction as illustrated in FIG. 9 and FIG. 10 as the locking capsule. Of these, the locking capsule 11a that is illustrated in FIG. 9 is integrally formed by performing plastic working such as forging of a ferrous alloy such as mild steel, or by die casting of a light alloy such as an aluminum alloy or magnesium alloy, or by performing injection molding of a high-performance resin having high strength such as polyacetal. The width dimension in the left-right direction and the length dimension in the forward-backward direction are greater in the upper half than in the lower half, and a flange section 44 that protrudes on both sides and the rear side is formed on the upper half section of both the left and right side surfaces and the rear surface of the locking capsule 11a. The lower half section of this kind of locking capsule 11a fits inside the locking notch 17b that is open on the front end edge of the vehicle-side bracket 10b, and is supported by this vehicle-side bracket 10b so that it can break away toward the front due to an image load that is applied during a secondary collision. In order for this, small through holes 19a, 19b are formed in a plurality of locations (for example, eight locations) that are aligned with each other in the flange section 44 and perimeter edge section of the locking notch 17b in part of the vehicle side bracket 10b. Locking pins 45 span between these small through holes 19a and small through holes 19b.

The locking capsule 11a as described above, is connected and fastened to the column-side bracket 13a by a plurality (for example, three) bolts 46 and nuts 47 in a non-separated state regardless of an impact load. In other words, by inserting the tip end section (top end section) of the bolts 46 through the through holes that are formed in the locking capsule 11a and column-side bracket 13a so as to be aligned with each other, and screwing the nuts 47 on the portions that protrude from the top surface of the locking capsule 11a and further tightening, the locking capsule 11a and the column-side bracket 13a are connected and fastened together. In the case of the construction illustrated in FIG. 9, a locking groove 18a is formed in the portion between the bottom surface of the flange section 44 and the top surface of the top plate section 48 of the column-side bracket 13a, and this locking groove 18a is for locking the perimeter edge of the locking notch 17b on part of the vehicle-side bracket 10b. The top plate section 48 is provided in a state where the top end edges of the pair of left and right support plate sections 33 of the column-side bracket 13a are made to be continuous.

Moreover, the locking capsule 11b that is illustrated in FIG. 10 is formed by performing bending of a metal plate having sufficient strength and rigidity, and comprises a base plate section 49, a pair of left and right raised sections 50, and a pair of left and right brim sections 51. The base plate section 49 is a flat plate. The raised sections 50 are bent upward at nearly right angles from both end sections in the width direction of the base plate section 49. Furthermore, the brim sections 51 are bent at nearly right angles in opposite directions from each other from the top ends of the pair of raised sections 50. The height (H) of the difference between the bottom surface of the brim sections 51 and the bottom surface of the base plate section 49 is the same as the thickness (T) of the metal plate of the vehicle-side bracket 10a, or is a little greater than the thickness (T) (H≥T).

In the case of this kind of locking capsule 11b, the portion between the bottom surface of the pair of brim sections 51 and the top surface of the top plate section 48 of the column-side bracket 13 becomes the locking groove 18b for locking the edges on both ends in the width direction of the locking notch 17b on part of the vehicle-side bracket 10b. The locking capsule 11b is connected and fastened to the top plate section 48 of the column-side bracket 13a by bolts 46a having circular plate shaped head sections 52 and nuts 47. The amount that the thickness (dimension in the up-down direction) of the head sections 52 of these bolts 46a and the locking capsule 11b is less compared with the locking capsule 11a illustrated in FIG. 9 makes it possible to suppress an increase in the assembly height, and thus makes it possible to make the locking capsule more compact and lightweight.

In either case, when spanning locking pins 45 between the small through holes 19a that are formed in the locking capsule 11a, 11b, and the small through holes 19b that are formed in the vehicle-side bracket 10b, with these small through holes 19a, 19b aligned, synthetic resin is injected inside these small through holes 19a, 19b. In this state, part of the synthetic resin material of the locking pins 45 enters into the space between the top and bottom surfaces of the vehicle-side bracket 10b and the opposing surfaces, which are the bottom surface of the flange section 44 (or brim section 50) and the top surface of the column-side bracket 13a. By this structure, regardless of there being minute spaces between these surfaces, backlash movement of the installation section of the column-side bracket 13a with respect to the vehicle-side bracket 10b is eliminated. In FIG. 9, for clarification, the height of the space that is the cause of this backlash movement is drawn larger than actual size. As described above, by spanning the locking pins 45 between the small through holes 19a and the small through holes 19b, the locking capsule 11a, 11b is supported by the vehicle-side bracket 10b so as to be able to break away toward the front due to an impact load that is applied during a secondary collision.

Incidentally, in order to achieve a steering apparatus having a good operational feeling for the operator, preferably the support rigidity of the column-side bracket with respect to the vehicle-side bracket is high. The reason for this is that when the operator operates the steering wheel when the support rigidity is low, it becomes easy for the steering column that is supported by the column-side bracket to displace. When the steering column displaces, the operator who is operating the steering wheel that is supported by the steering column by way of a bearing and steering shaft receives an uncomfortable feeling.

In the construction illustrated in FIG. 10, in order to increase the support rigidity of the column-side bracket 13a with respect to the vehicle-side bracket 10b, causing the synthetic resin of the locking pins 45 to permeate into the minute spaces between the top surface of the top plate section 48 of the column-side bracket 13a and the bottom surface of the vehicle-side bracket 10b is effective. By covering the minute spaces with synthetic resin and preventing relative displacement between the vehicle-side bracket 10b and the column-side bracket 13a due to the existence of the minute spaces, it is possible improve the support rigidity. However, synthetic resin has elasticity, so even when synthetic resin permeates into the minute space, when the pitch (span) of the synthetic resin in both end sections in the width direction of the vehicle-side bracket 10b and the column-side bracket 13a is short, there is a disadvantage from the aspect of ensuring support rigidity.

Incidentally, in the case of the construction illustrated in FIG. 9 and FIG. 10, it is difficult to check whether or not synthetic resin has sufficiently permeated into the minute space between the vehicle-side bracket 10b and the column-side bracket 13a. Moreover, lengthening the span of the synthetic resin that exists in both end sections in the width direction of these brackets is not particularly taken into consideration. Therefore, in the case of this construction, it is not possible to stably and sufficiently increase the support rigidity of the column-side bracket with respect to the vehicle-side bracket.

On the other hand, in the case of this example, in order to stably and sufficiently increase the support rigidity of the column-side bracket 13a with respect to the vehicle-side bracket 10a, small through holes 19b and notch sections 53, which are both fastening side volume sections, are formed in the surrounding portion and in edge section of the locking notch 17a. Of these, the small through holes 19b are formed at a plurality of locations (for example, four locations in the figure) in the portion near the rear end of the vehicle-side bracket 10a, and being independent from the locking notch 17a, or in other words, being separated by part of the metal plate of the vehicle-side bracket 10a, these small through holes 19b are not connected to each other. On the other hand, the notch sections 53 are formed at a plurality of locations (for example, in the figure there are two on each end for a total of four) in the edge section on both ends in the width direction of the locking notch 17a being separated in the forward-backward direction and being open to the locking notch 17a side. The locking capsule 11c that is illustrated in FIG. 4 to FIG. 7 is formed by bending metal plate, and has a brim section 51a that protrudes toward both the left and right side and toward the rear. The locking capsule 11c and the vehicle-side bracket 10a are constructed so as to be connected by locking pins 46a on three sides, which are the left and right sides and the rear side. However, the construction of the locking capsule is not limited to this. For example, in a variation of this example, it is also possible to employ the locking capsule 11a illustrated in FIG. 1 to FIG. 3 and FIG. 9.

Moreover, the same number of concave sections 54a, 54b as the total number of small through holes 19b and notch sections 53 (eight locations in the example in the figure) are formed in the bottom surface of the vehicle-side bracket 10a. One end of these concave sections 54a, 54b connects with the small through holes 19b or notch sections 53, which are volume sections on the fastening side. Furthermore, the other end of these concave sections 54a, 54b is open further on the external space side than the portion where the bottom surface of the vehicle-side bracket 10a faces the top surface of the top plate section 48 of the column-side bracket 13a. This column-side bracket 13a is such that the edges on the top end of the pair of left and right support plate sections 33 and the edges on the left and right ends of the top plate section 48 are continuous by way of a curved section 55 having an arc shaped cross section. When the vehicle-side bracket 10a and the column-side bracket 13a are combined, the top surface of this curved section 55 is isolated from the bottom surface of the vehicle-side bracket 10a. The other end sections of the concave sections 54a, 54b are located in a portion that faces the top surface of the curved sections 55 and are exposed to the external space. In this way, the extent that the other end sections of the concave sections 54a, 54b are exposed to the external space is set by design according to formation conditions such as the injection pressure, the viscosity (temperature) of the synthetic resin and the like when performing injection molding of the locking pins 45a, and the extent that the synthetic resin is to be exposed to the external space (protruding amount). The chain line α in FIG. 7 indicates the flat portion on the top plate section 48 with the curved section 55 removed, or in other words, the range of the portion that can come in contact with the bottom surface of the vehicle-side bracket 10a.

The column-side bracket 13a and the locking capsule 11c (11a), being combined with bolts 46a (46) and nuts 47 (three in the figure), are connected with locking pins 45. When forming these locking pins 45a, the small through holes 19a that are formed in the brim section 51a of the locking capsule 11c (or in the flange section 44 of the locking capsule 11a) are aligned with the small through holes 19b and notch sections 53 that are formed on the vehicle-side bracket 10a. Thermoplastic synthetic resin that has been heat and melted is injected into the small through holes 19b and notch sections 53 from the side of the small through holes 19a that are formed in the brim section 51a (or in the flange section 44).

In the case of the support apparatus for a steering column of this example, part of the synthetic resin of the locking pins 45a is exposed on the external space side through the concave sections 54a, 54b. In this way, it is possible to easily check visually or by was of a contact type or non-contact type sensor whether or not there is synthetic resin exposed to the external space side. By being able to confirm that there is synthetic resin exposed to the external space in this way, it is possible to at least know the state of how the synthetic resin of the locking pins 45a has permeated in between the bottom surface of the vehicle-side bracket 10a and the top surface of the top plate section 51 of the column-side bracket 13a into the concave sections 54a, 54b and the nearby portions. In this state, displacement due to minute space between the surfaces of the vehicle-side bracket 10a and the column-side bracket 13a that face each other is suppressed. Therefore, by checking whether or not part of the synthetic resin is exposed to the external space side by way of the concave sections 54a, 54b and removing parts wherein synthetic resin is not exposed to the external space, it is possible to stably ensure the support rigidity of the column-side bracket 13a with respect to the vehicle-side bracket 10a.

Moreover, of the concave sections 54a, 54b, the concave sections 54a, 54b that are provided in the portions that face the bottom surface of both end sections in the width direction of the brim section 51 are formed in a direction from the small through holes 19a, 19b and notch sections 53 toward the edges on the ends in the width direction of the top plate 48 of the column-side bracket 13a. Therefore, the synthetic resin of the locking pins 45a that are formed inside the concave sections 54a, 54b on both ends in the width direction exists up to the edges of the ends in the width direction of the flat portion of the top plate section 48, and in that portion, the synthetic resin is held between the top surface of the top plate section 48 and the bottom surface of the vehicle-side bracket 10a. Consequently, it is possible to lengthen the span in the width direction of the synthetic resin that exists between the bottom surface of the vehicle-side bracket and the top surface of the column-side bracket 13a, and it becomes easy to maintain support rigidity of the column-side bracket 13a with respect to the vehicle-side bracket 10a.

When performing injection molding of the locking pins 45a, it is also possible to cover the opening on the external space side of the space existing between the bottom surface of the vehicle-side bracket 10a and the top surface of the curved section 55, so that surplus synthetic resin does not flow out through the concave sections 54a, 54b to the external space side and become lost. In order for this, as illustrated in FIG. 8A, a blocking tool 56 that comprises a right angle corner section on the tip end section thereof is brought into contact with the bottom surface of the vehicle-side bracket 10a and the outside surface on the top end section of the supporting plate section 33 of the column-side bracket 13a and blocks the opening on the external space side of the space. In this state, when synthetic resin is injected into the small through holes 19a, 19b and notch sections 53, the synthetic resin is prevented from flowing in surplus to the external space side, and thus it is possible to prevent a worsening of yield of material.

Moreover, as illustrated in FIG. 8B, a blocking tool 56a having a curved surface section with arc shaped cross section on the tip end thereof can be pressed against the section where the bottom surface of the vehicle-side bracket 10a comes in contact with the top surface of the curved section 55 of the column-side bracket 13a. In this case, the blocking tool 56a blocks the opening on the external space side of the concave sections 54a, 54b, and causes one or both of the column-side bracket 13a and vehicle-side bracket 10a to elastically deform in a direction that separates the top surface of the column-side bracket 13a from the bottom surface of the vehicle-side bracket 10a. In this state, synthetic resin is injected into the small through holes 19a, 19b and notch sections 53. This synthetic resin is then cooled and hardened, forming locking pins 45a, after which the blocking tool 56a is removed. As the blocking tool is removed and the force in the direction separating the top surface of the column-side bracket 13a and the vehicle-side bracket 10a is lost, a force in the direction bringing these surfaces together is applied, and part of the synthetic resin that entered inside the concave sections 54a, 54b and the space between the surfaces that is near the concave sections 54a, 54b is elastically held between the bottom surface of the vehicle-side bracket 10a and the top surface of the column-side bracket 13a.

Figure 1:
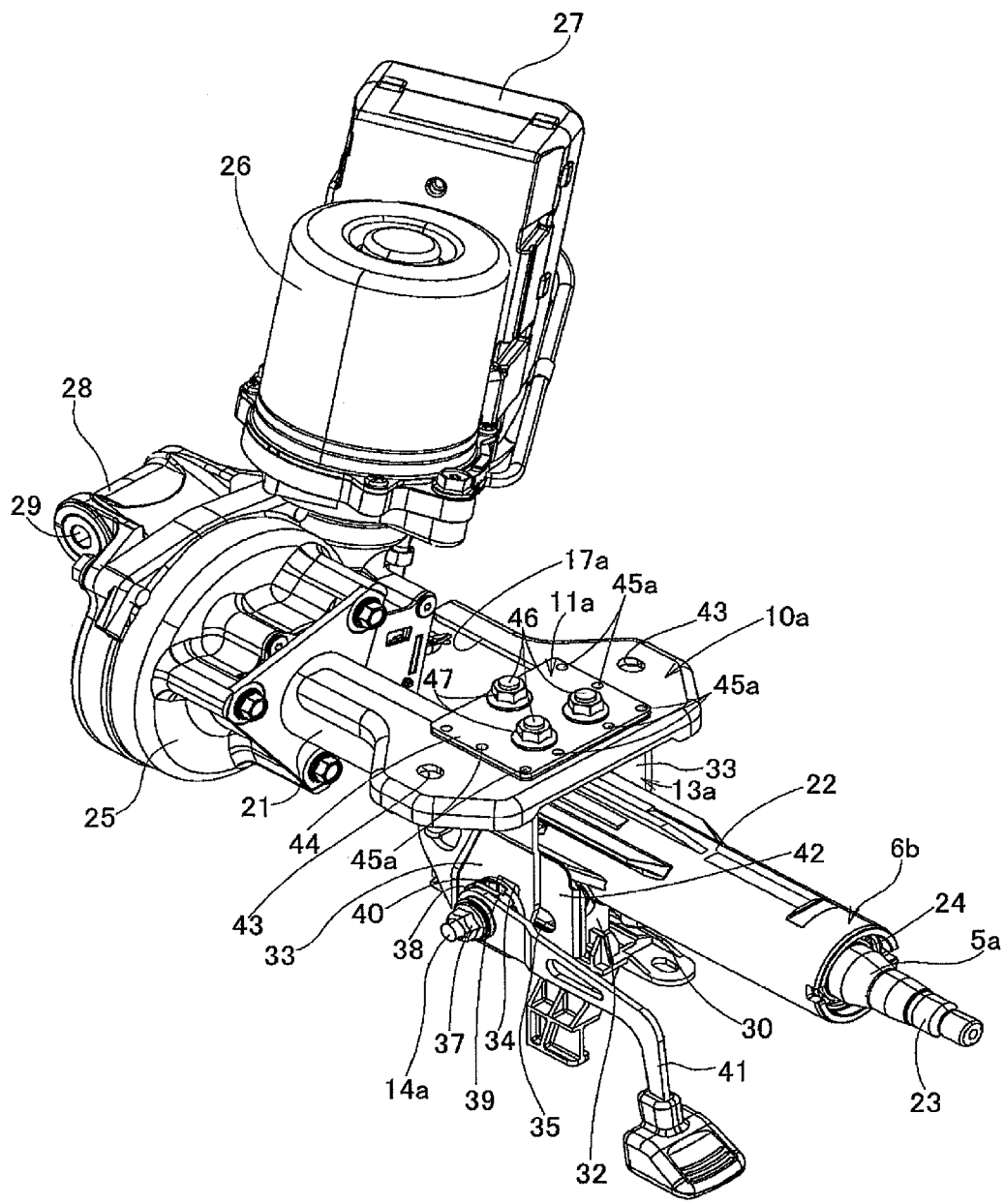
FIG. 1 is a perspective view of a first example of a first embodiment of the present invention, and illustrates the state as seen from the upper rear.
Figure 2:
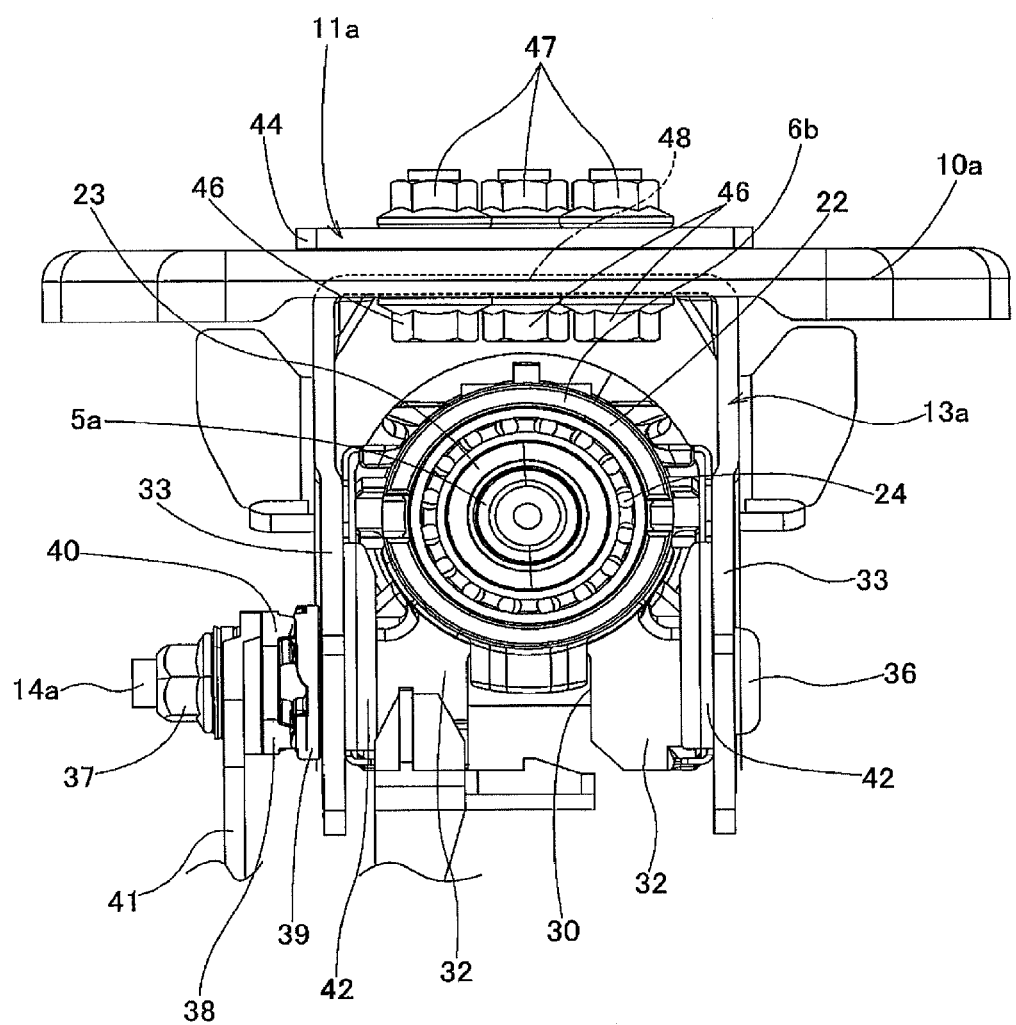
FIG. 2 is an orthographical view of the first example of the first embodiment, and illustrates the state as seen from the rear with part omitted from the drawing.
Figure 3:
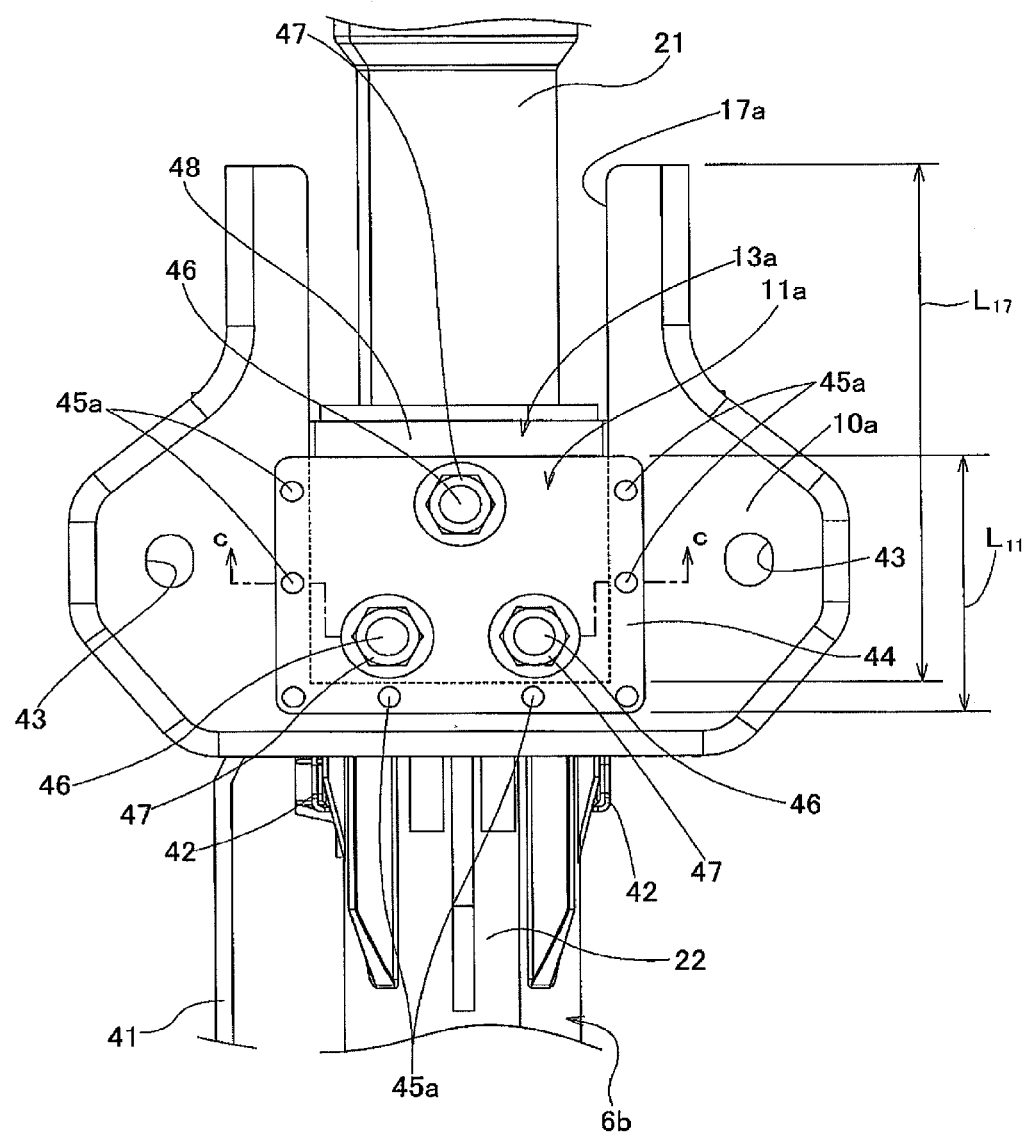
FIG. 3 is a top view illustrating the state in FIG. 2 as seen from above.
Figure 4:
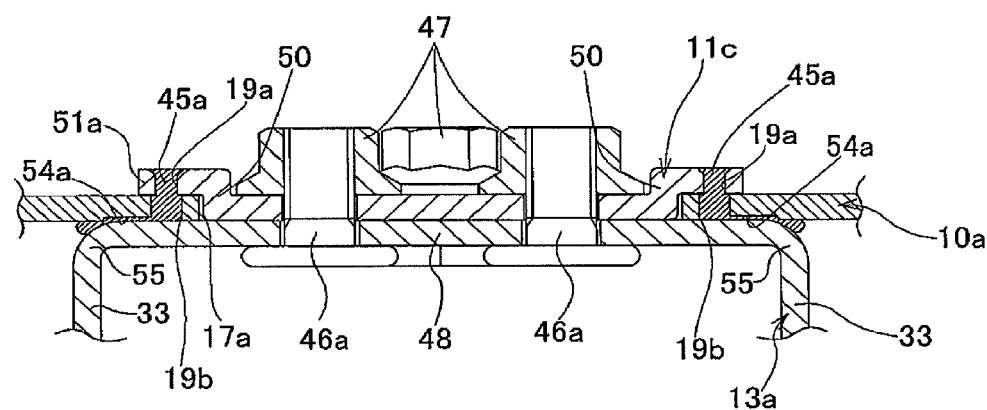
FIG. 4 is a cross-sectional view of the first example of the first embodiment, and illustrates section a-a in FIG. 7 when a vehicle-side bracket and a column-side bracket are combined by way of a locking capsule.
Figure 5:
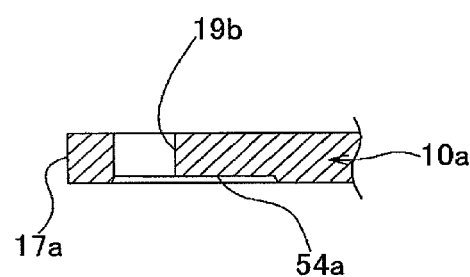
FIG. 5 is an enlarged cross-sectional view of the right portion in FIG. 4 with only the vehicle-side bracket removed, and illustrates the state before synthetic resin is injected into the small through holes.
Figure 6:
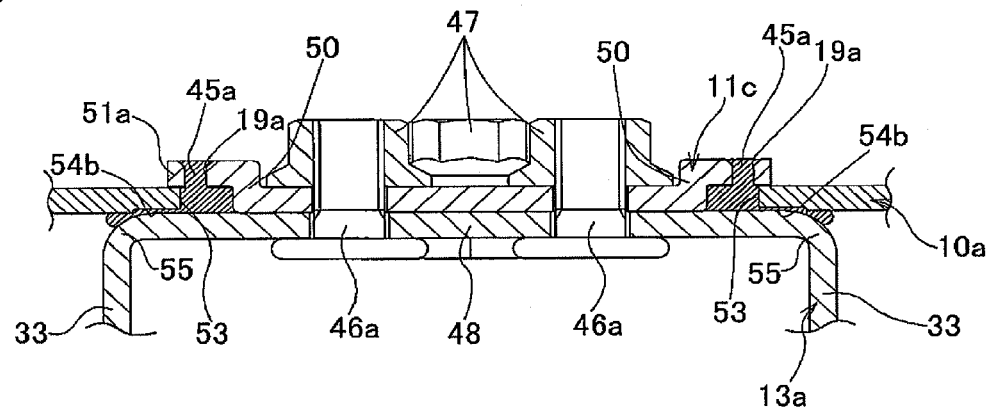
FIG. 6 is a drawing similar to FIG. 5 and is a cross-sectional view of section b-b in FIG. 7.
Figure 7:
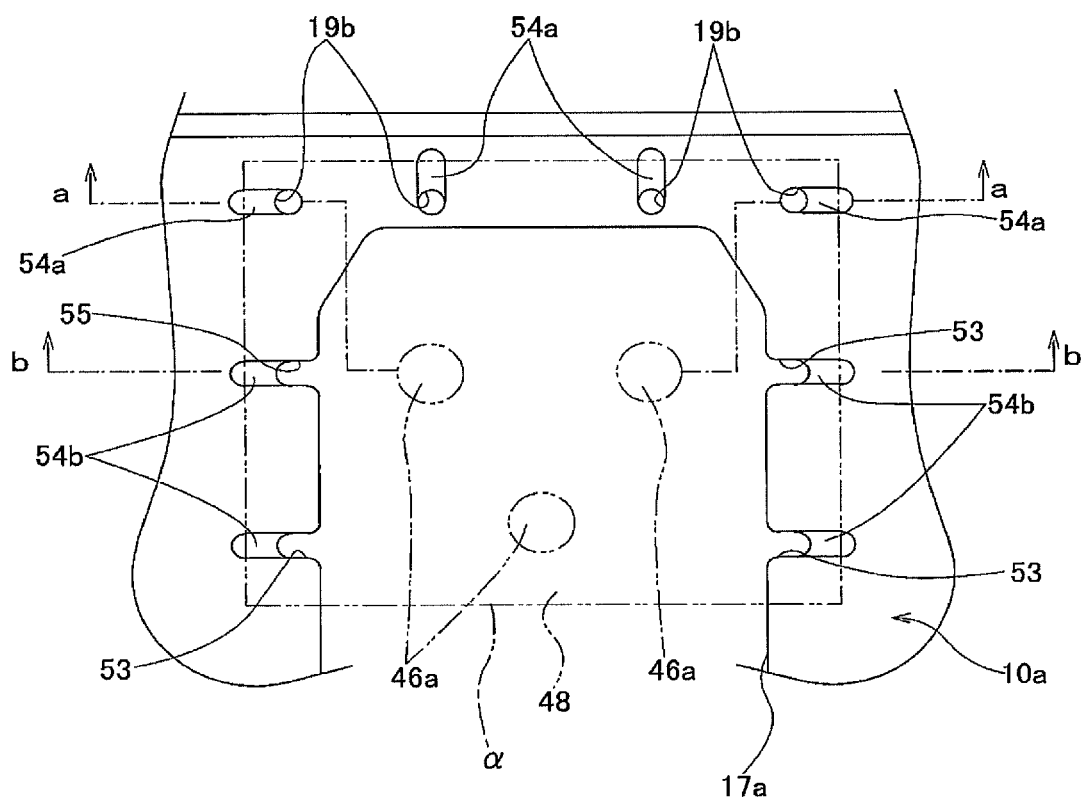
FIG. 7 is a view of the center section in the width direction of a vehicle-side bracket of the first example of the first embodiment as seen from below.
Figure 8:
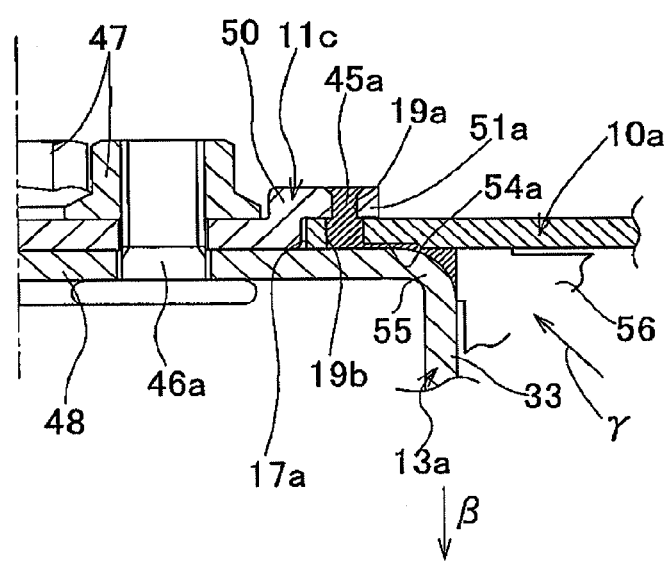
FIG. 8 is a cross-sectional view corresponding to the right half in FIG. 4, and illustrates two examples of the state wherein locking pins are formed by injecting synthetic resin in small holes that are formed in the vehicle-side bracket and column-side bracket.
Figure 8:
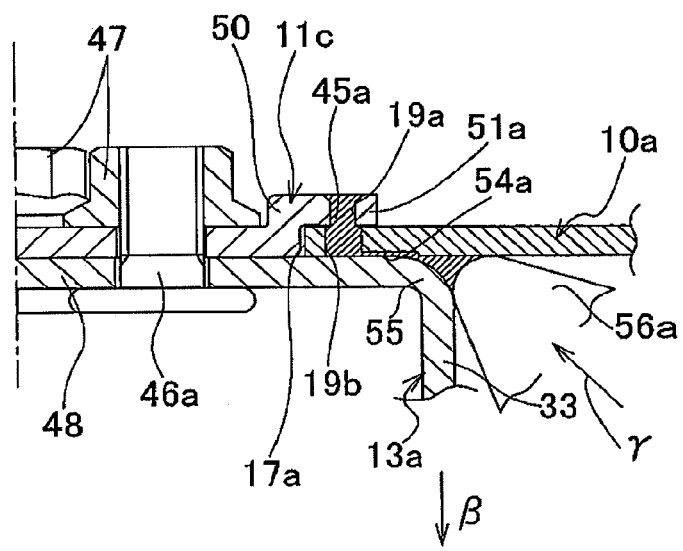

Even in the case of using the blocking tools 56, 56a, the synthetic resin that is injected into the small through holes 19a, 19b and notch sections 53 is cooled and solidified inside these small through holes 19a, 19b and notch sections 53, and becomes locking pins 45a. In this state, the column-side bracket 13a and locking capsule 11c (11a) are supported by the vehicle-side bracket 10a so as to be able to break away toward the front due to an impact load that is applied during a secondary collision. Moreover, part of the synthetic resin of the locking pins 45a penetrates into the concave sections 54a, 54b and is exposed to the external space side by way of these concave sections 54a, 54b. Part of the synthetic resin that penetrates inside the notch sections 53 reaches the opening end of the notch sections 53 as illustrated in FIG. 6 and further penetrates to the space between the outside surface of the pair of raised sections 50 of the locking capsule 11c and the inside edge of the locking notch 17a of the vehicle-side bracket 10a.

When performing injection molding of the locking pins 45a using a blocking tool 56, 56a, by appropriately controlling the pressure force of the blocking tool 56, 56a on the vehicle-side bracket 10a, or in other words, by performing control so that the pressure becomes somewhat large, it is possible to sufficiently increase the support rigidity of the column-side bracket 13a with respect to the vehicle-side bracket 10a. In other words, as indicated by the arrows β in FIG. 8A and FIG. 8B, the weight of the steering column, steering shaft, steering wheel and component parts of the electric power steering apparatus on the column-side bracket 13a is applied in the downward direction. Therefore, there is a tendency due to this weight for the column-side bracket 13a to displace downward with respect to the vehicle-side bracket 10a, and the surface pressure at the area of contact between the column-side bracket 13a and the vehicle-side bracket 10a and the rigidity at the connection between the column-side bracket 13a and the vehicle-side bracket 10a decrease, and due to the vibration that is applied as the vehicle travels, the column-side bracket 13a vibrates and it becomes easy for the operator who is operating the steering wheel to receive an uncomfortable feeling. Therefore, when performing injection molding of the locking pins 45a, with the displacement of the column-side bracket 13a suppressed, the blocking tool 56, 56a pushes the vehicle-side bracket 10a in the direction indicated by the arrows γ in FIG. 8A and FIG. 8B, and injection molding of the locking pins 45a is performed in a state of relative displacement between the vehicle-side bracket 10a and column-side bracket 13a that is equal to or greater than the displacement that corresponds to the displacement in the direction of arrows β due to the weight of the component parts and the like. By releasing the force in the direction of the arrow γ after injection molding, the elastic recovery of the column-side bracket 13a and vehicle-side bracket 10a makes it possible to sufficiently ensure the rigidity of the connecting section between the column-side bracket 13a and the vehicle-side bracket 10a regardless of the force in the direction of the arrow β.

By using a blocking tool 56a as illustrated in FIG. 8B to perform injection molding of the locking pins 45a while separating the top surface of the column-side bracket 13a and the bottom surface of the vehicle-side bracket 10a, it is possible for synthetic resin to more completely and sufficiently penetrate into the minute space between the column-side bracket 13a and the vehicle-side bracket 10a, particularly in the portions separated from the concave sections 54a, 54b. Furthermore, in the state after injection molding, synthetic resin that entered into the space between the column-side bracket 13a and the vehicle-side bracket 10a, including this portion, is elastically held, or in other words, is compressed in the thickness direction, so it is possible to further increase the rigidity (difficulty for displacement) of the connecting section between the column-side bracket 13a and the vehicle-side bracket 10a.

The locking capsule 11a (11c) is connected and fastened to the column-side bracket 13a in a non-separated state regardless of whether there is an impact load, so an impact load that is transmitted to the column-side bracket 13a from the outer column 22 during a secondary collision is transmitted as is to the locking capsule 11a (11c), and as the locking pins 45a shear, the outer column 22 also displaces in the forward direction in synchronization with the forward displacement of the locking capsule 11a (11c).

In this way, the length ($L_{17}$) in the forward-backward direction of the locking notch 17a, which locks the locking capsule 11a (11c) that displaces in the forward direction together with the outer column 22 during a secondary collision, is sufficiently greater than the length ($L_{11}$) in the same direction of the locking capsule 11a (11c) ($L_{17} \gg L_{11}$). In this example, the length $L_{17}$ of the locking notch 17a is maintained at two times or greater the length ($L_{11}$) of the locking capsule 11a (11c) ($L_{17} \geq 2L_{11}$). When the locking capsule 11a (11c) has displaced together with the outer column 22 as far as possible in the forward direction during a secondary collision, or in other words, even when further forward displacement due to an impact load that is applied from the steering wheel 1 is no longer possible, the portion on at least the rear end section of the flange section 44 (or brim section 51a) of the locking capsule 11a (11c) that can support the weight of the steering column 6b, the column-side bracket 13a and the like does not come out from the locking notch 17a. In other words, even when a secondary collision advances, the rear end section of the flange section 44 that is formed in the portion on both sides in the width direction of the upper half of the locking capsule 11a is located on the top side of the front end section of the vehicle-side bracket 10a, and is such that the locking capsule 11a (11c) can be prevented from dropping down.

Moreover, with the support apparatus for a steering column of this example, tuning for allowing the steering wheel 1 to displace stably in the forward direction during a secondary collision can be performed easily, and even when a secondary collision has advanced, it is possible to prevent the steering wheel 1 from dropping excessively. In other words, simplification of tuning for allowing the steering wheel 1 to displace stably in the forward direction during a secondary collision is made possible by having the vehicle-side bracket 10a and the locking capsule 11a (11c) to fit in only the center section in the width direction of the vehicle-side bracket 10a. That is, there is only one locking capsule 11a (11c) located in the portion directly above the outer column 22, so an impact load that is transmitted to the locking capsule 11a (11c) from the steering wheel 1 by way of the outer shaft 23 and outer column 22 during a secondary collision is evenly applied to the locking pins 45a that connect this locking capsule 11a (11c) and the vehicle-side bracket 10a. The locking pins 45a that connect this single locking capsule 11a (11c) and the vehicle-side bracket 10a essentially shear at the same time. As a result, displacement in the forward direction of the outer column 22 that is connected to the locking capsule 11a (11c) by way of the column-side bracket 13a is performed smoothly without the inclination of the center axis changing excessively.

Furthermore, in the case of the construction of this example, the synthetic resin that penetrates from the notch sections 53 to the space between the outside surfaces of the pair of raised sections 50 and the inside edge of the locking notch 17a and solidifies improves the rigidity in the width direction of the connecting section between the locking capsule 11a and the vehicle-side bracket 10a. In addition, the synthetic resin that is solidified inside the above space prevents direct rubbing between the outside surfaces of the pair of raised sections 50 and the inside edge of the locking notch 17a. Therefore, even in the case where this inside edge, like a shear surface, is rough with a large coefficient of friction, it is possible for the locking capsule 11a (11c) to easily come out in the forward direction from the locking notch 17a during a secondary collision.

Embodiment 1

Example 2

Figure 11:
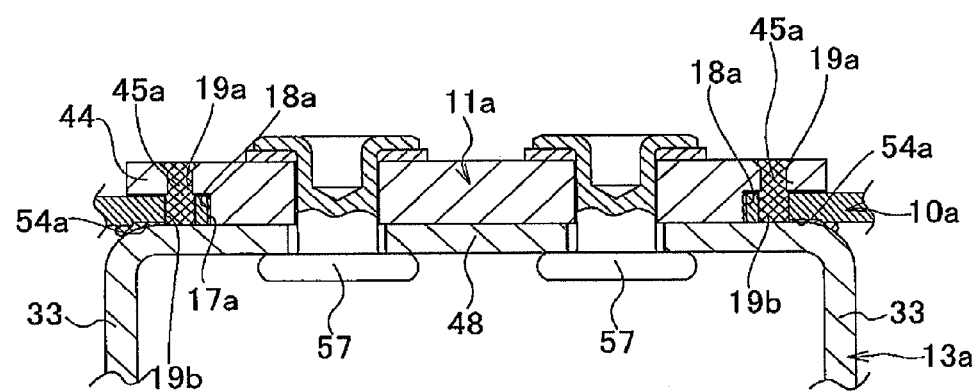
FIG. 11 is a cross-sectional view similar to FIG. 1, and illustrates a second example of the first embodiment of the present invention.

FIG. 11 illustrates a second example of the first embodiment of the present invention. In the case of this example, the locking capsule 11a and the column-side bracket 13a are connected by a plurality of rivets 57. Preferably, in order to achieve the construction of this example, the top plate section 48 of the column-side bracket 13a has a shape such that in the free state a space occurs between it and the center section of the bottom surface of the locking capsule 11a. Crimping of the rivets 57 is then performed in a state where the top plate section 48 is elastically deformed upward. By doing so, the elasticity of the top plate section 48 eliminates the space in the crimped section of these rivets 57, and thus backlash movement in the connecting section between the locking capsule 11a and the column-side bracket 13a is eliminated. The construction and function of the other parts is the same as in the first example of the first embodiment.

Embodiment 1

Example 3

Figure 12:
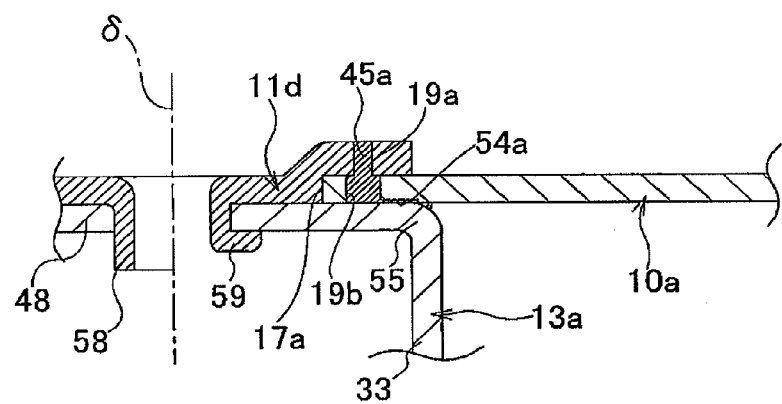
FIG. 12 is a cross-sectional view corresponding to the right section in FIG. 1, and illustrates a third example of the first embodiment of the present invention.

FIG. 12 illustrates a third example of the first embodiment of the present invention. In this example, the locking capsule 11d and the column-side bracket 13a are connected and fastened by a crimped section 59 that is formed by plastically deforming the portion on part of a locking capsule 11d that is made of a plastically deformable metal material that is near the tip end of a cylindrical section 58 (portion on the left side of the chain line δ in FIG. 12) toward the outside in the radial direction. The construction and function of the other parts are the same as in the second example of the first embodiment.

Embodiment 1

Example 4

Figure 13:
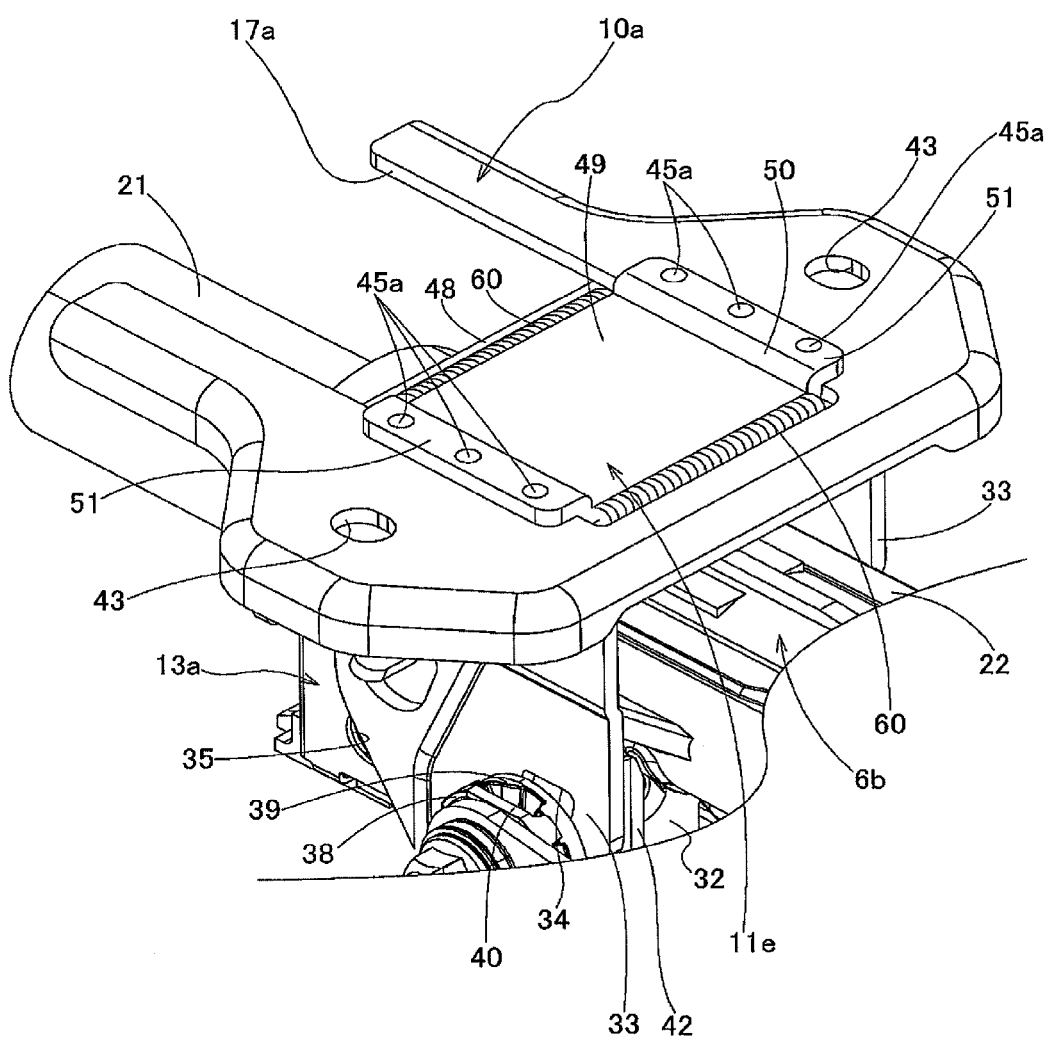
FIG. 13 is a perspective view corresponding to the center section in FIG. 1, and illustrates a fourth example of the first embodiment of the present invention.
Figure 14:
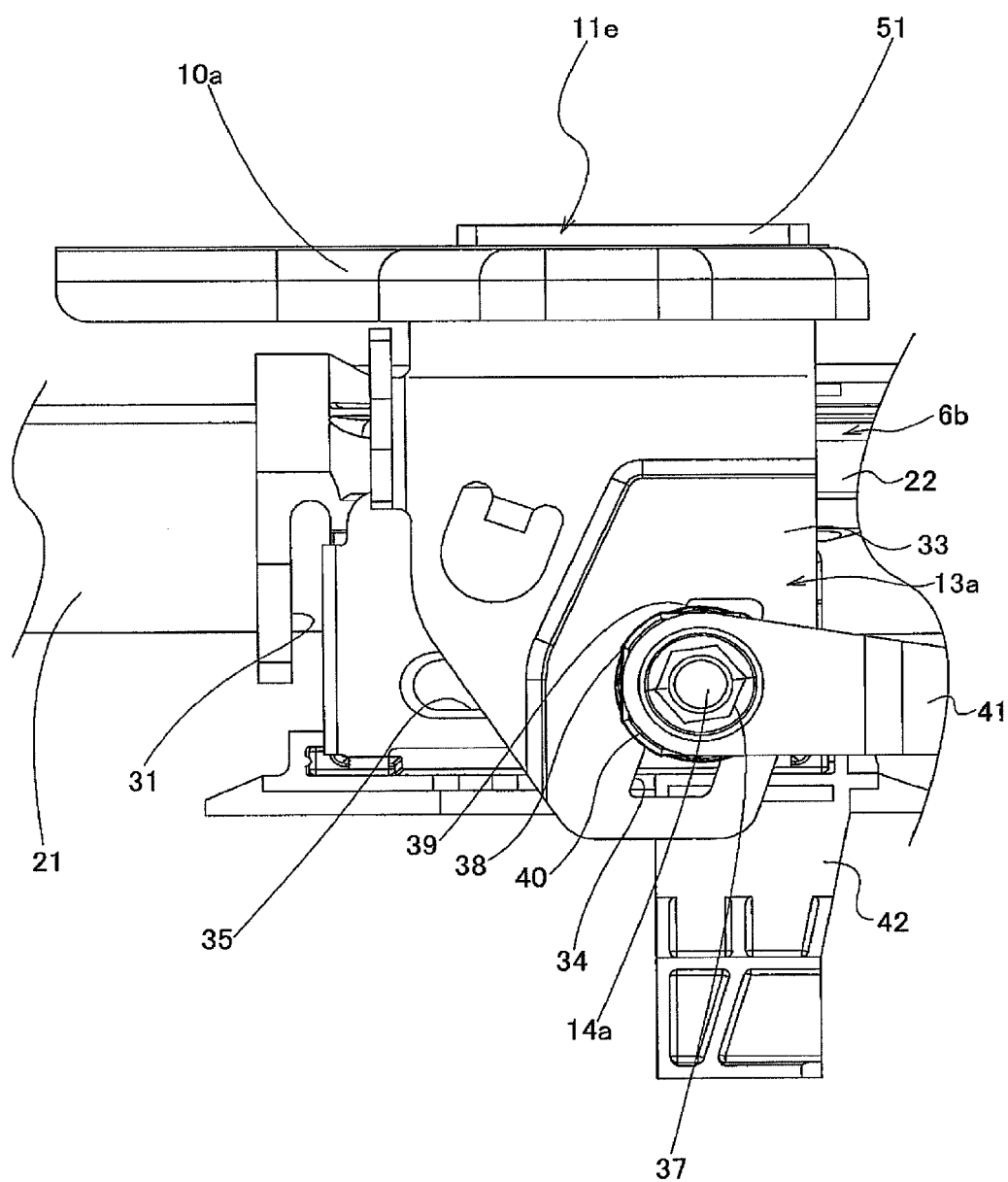
FIG. 14 is a side view illustrating the fourth example of the first embodiment.
Figure 15:
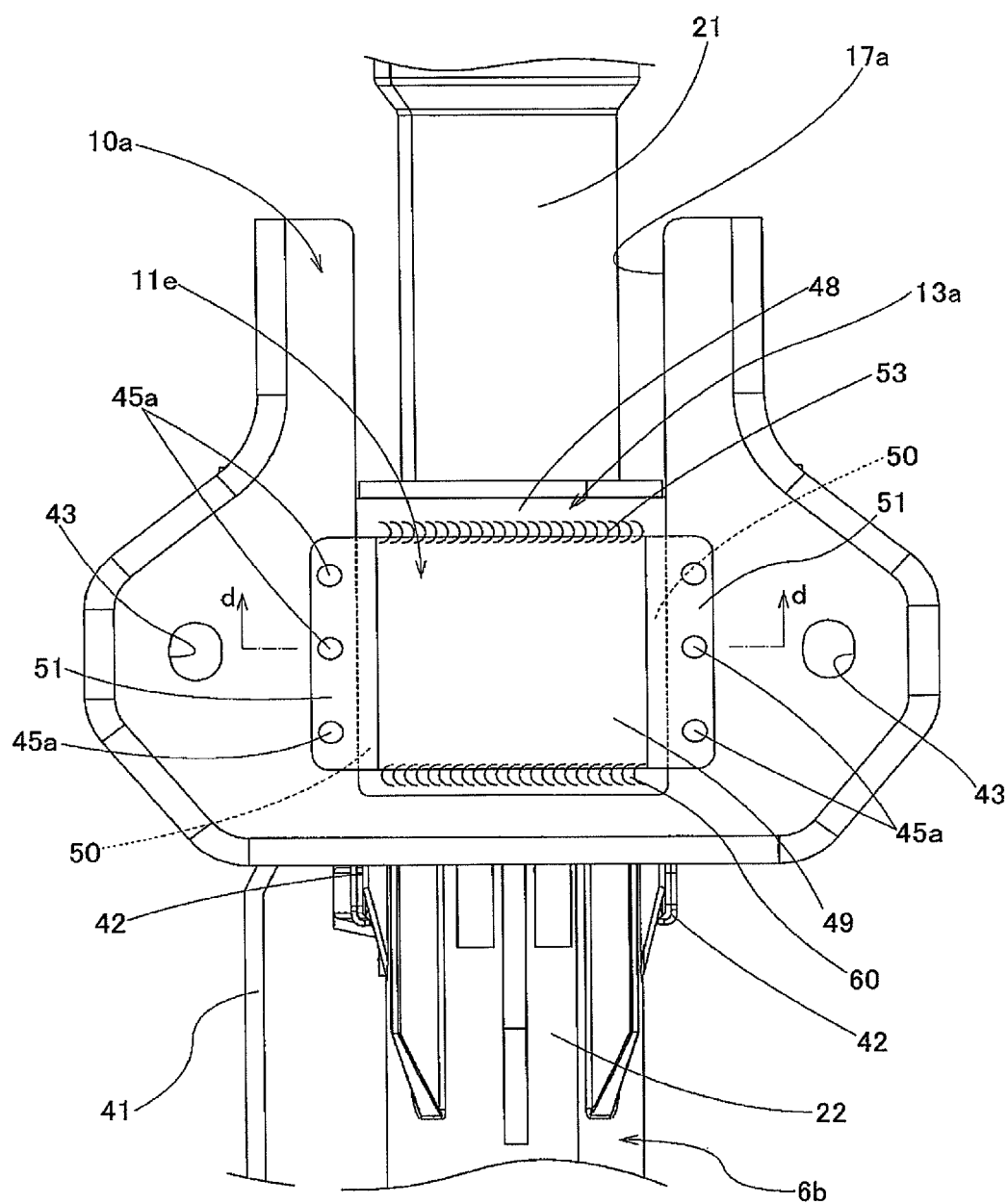
FIG. 15 is a top view illustrating the fourth example of the first embodiment.
Figure 16:
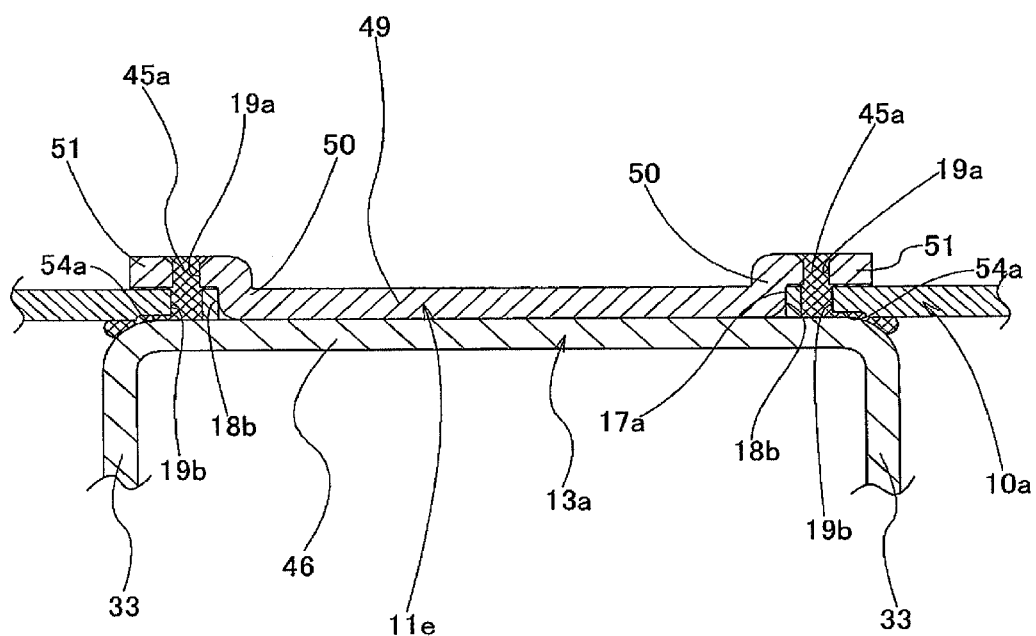
FIG. 16 is a cross-sectional view of section d-d in FIG. 15.

FIG. 13 to FIG. 15 illustrate a fourth example of the first embodiment of the present invention. In the case of the construction of this example, the locking capsule 11e and the column side bracket 13a are both formed using the same kind of metal plate, such as carbon steel plate, and because these members can be welded together, it is possible to ensure sufficient strength and rigidity. Moreover, the shape of the locking capsule 11e is the same as that of the locking capsule 11b that is illustrated in FIG. 10.

The locking capsule 11e of this example, with the base plate section 49 placed over the top plate section 48 of the column-side bracket 13a, is fastened to the top surface of the top plate section 48 by welding 60. With the locking capsule 11e welded and fastened to the top surface of the top plate section 48 in this way, locking grooves 18b, in which the edges on both ends in the width dimension of the locking notch 17 can be inserted, are formed between the portion near both ends of the top surface of the top plate section 48 and the bottom surfaces of the pair of brim sections 51 that are provided on both end sections in the width direction of the vehicle-side bracket 10a. The edge sections on both ends in the width direction of the locking notch 17a of the metal plate are inserted into the locking grooves 18b, and with the pair of brim sections 51 placed over the edge section on both ends in the width direction of the locking notches 17a of the metal plate, locking pins 45a are formed by injecting synthetic resin into the small through holes 19a, 19b that are formed in the overlapping portions so that they are aligned with each other. In this state, the locking capsule 11e and the column-side bracket 13a are connected to the vehicle-side bracket 10a so as to be able to break away toward the front due to an impact load during a secondary collision.

In the case of the construction of this example, the locking capsule 11e and the column-side bracket 13a, which are both are made of metal plate, are connected and fastened together by welding 60, so when compared with the construction of the first example and second example of the first embodiment, it is possible to suppress an increase in the assembly height due to the existence of bolts and nuts, and it is possible to make the apparatus more compact and lightweight. Moreover, since there is no need for bolts and nuts, it is possible to lower the cost, and due to being more compact, it is possible to ensure the freedom of design of the installation for the steering apparatus. The construction and function of other parts are the same as those of the first example and second example of the present invention.

Embodiment 1

Example 5

Figure 17:
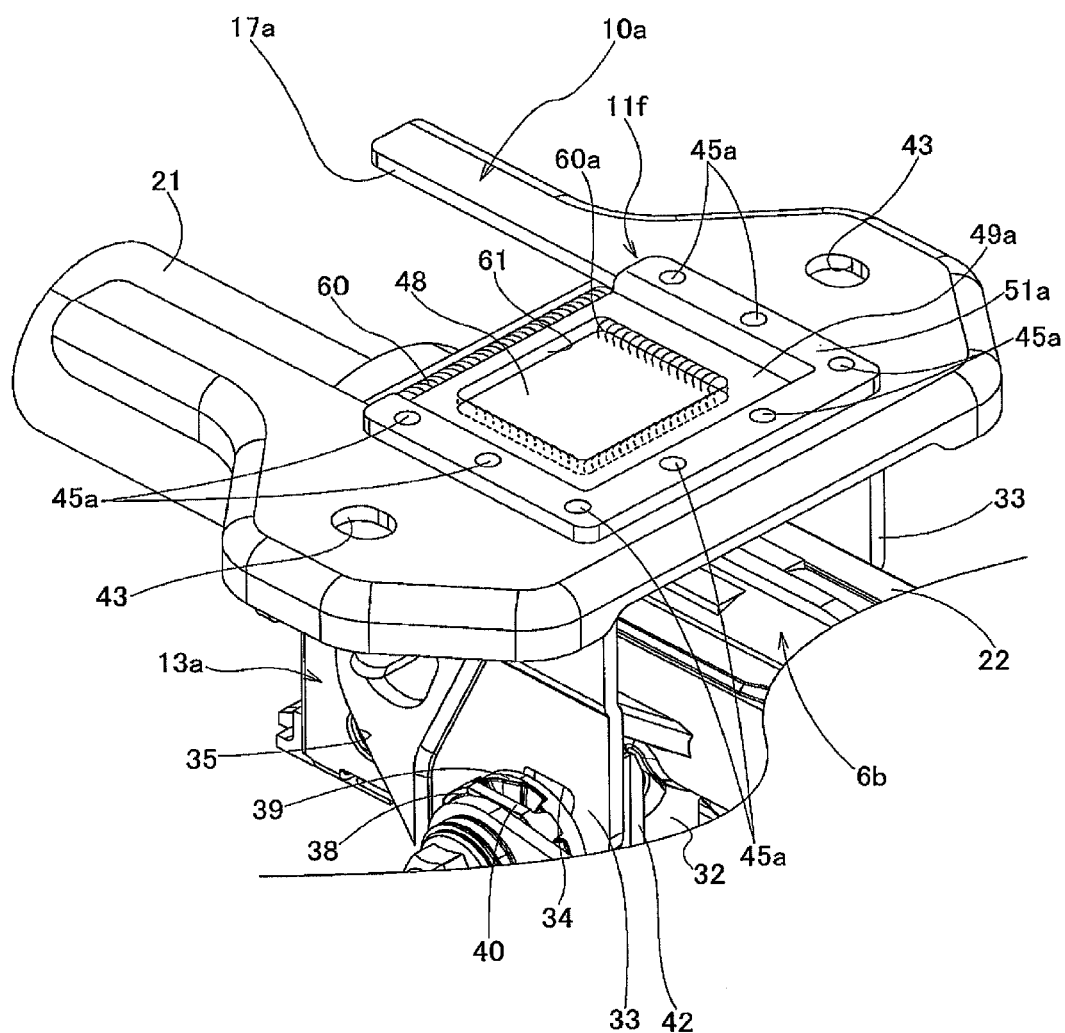
FIG. 17 is a drawing similar to FIG. 13, and illustrates a fifth example of the first embodiment of the present invention.

FIG. 17 illustrates a fifth example of the first embodiment of the present invention. In this example, a locking capsule 11f having a brim section 50a that protrudes to both the left and right sides and the rear is used, and this locking capsule 11f and vehicle-side bracket 10a are connected on three sides, the left and right side and rear end by locking pins 45a. In this example, an open hole 61 is formed in the center section of the base plate section 49a of the locking capsule 11f, and the portions of the perimeter edges of this open hole 61 except for the front end edge are welded to the top surface of the top plate section 48 of the column-side bracket 13a. The construction and function of the other parts are the same as in the fourth example of the first embodiment.

Embodiment 1

Example 6

Figure 18:
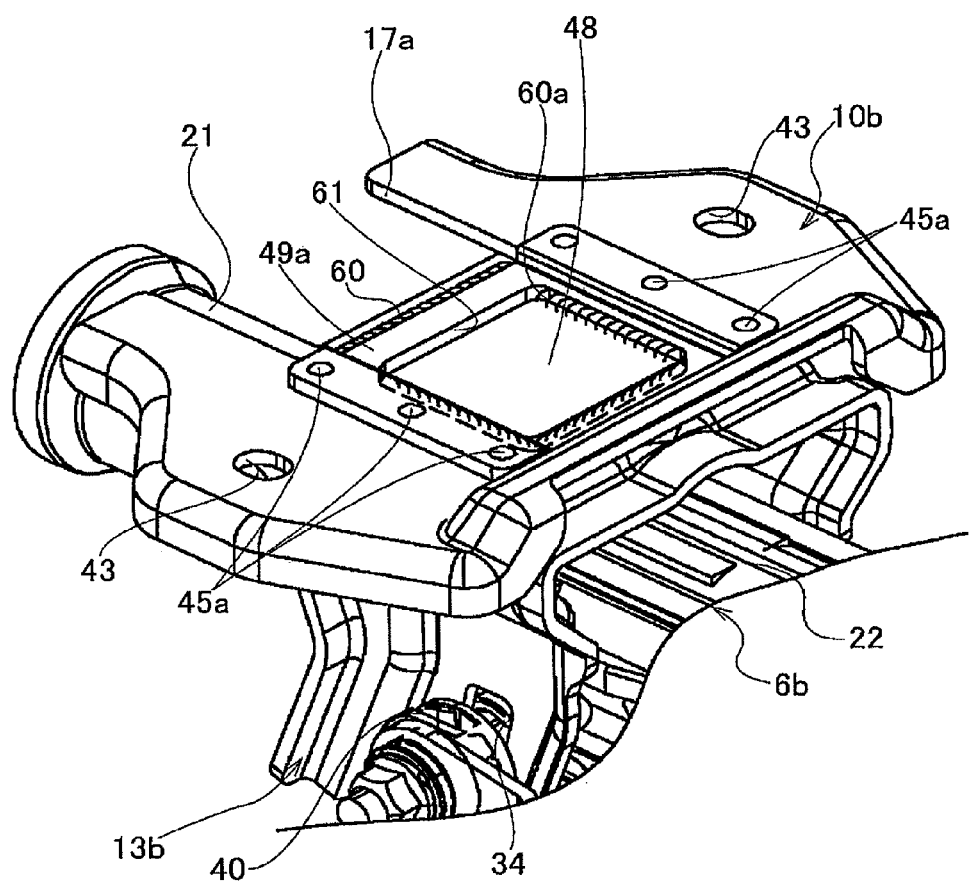
FIG. 18 is a drawing similar to FIG. 13, and illustrates a sixth example of the first embodiment of the present invention.

FIG. 18 illustrates a sixth example of the first embodiment of the present invention. In this example, part of the plate sections of the vehicle-side bracket 10b and the column-side bracket 13b are bent, which increases the section modulus of these plate sections, and increases the rigidity of the vehicle-side bracket 10b and the column-side bracket 13b. Together with increasing the support rigidity of the steering wheel 1 (see FIG. 44) during normal operation, smooth break away in the forward direction of the column-side bracket 13b during a secondary collision becomes possible. The construction and function of the other parts are the same as in the fifth example of the first embodiment.

Embodiment 1

Example 7

Figure 19:
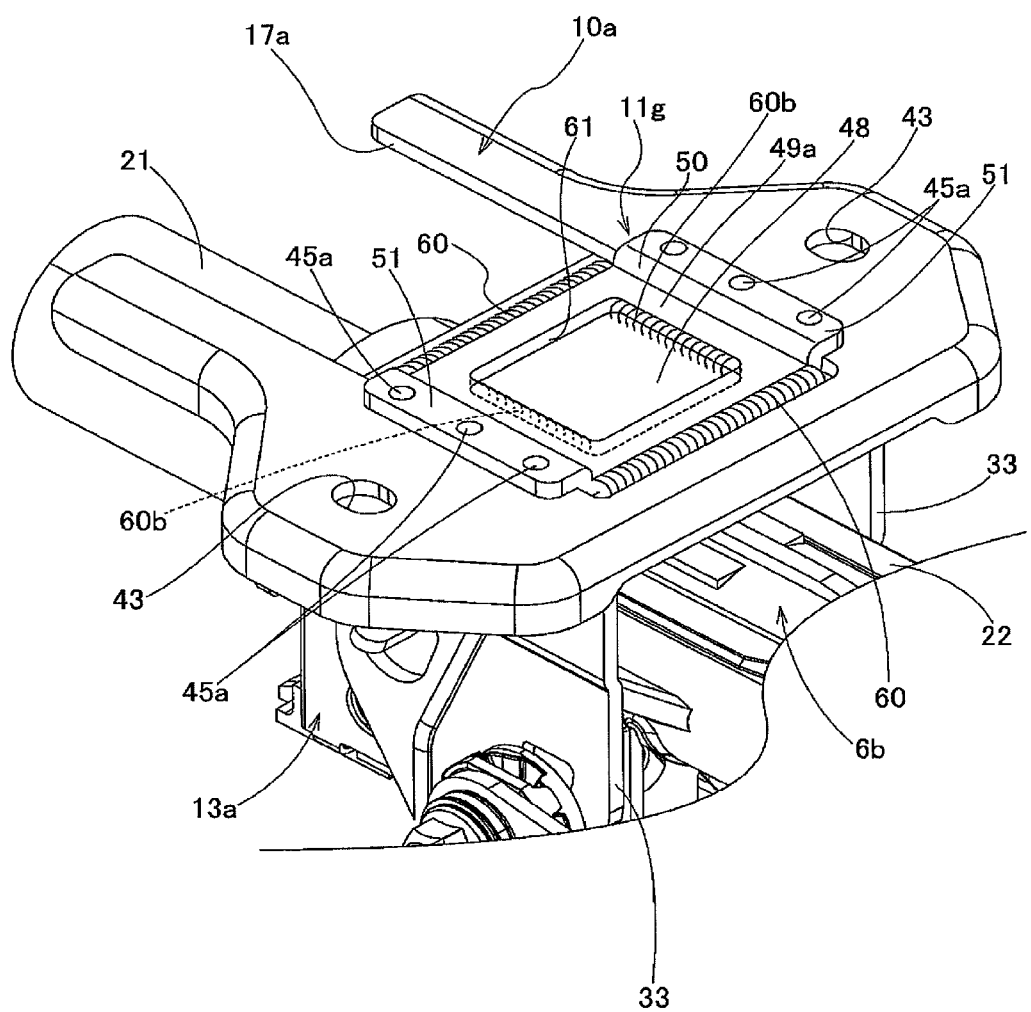
FIG. 19 is a drawing similar to FIG. 13, and illustrates a seventh example of the first embodiment of the present invention.

FIG. 19 illustrates a seventh example of the first embodiment of the present invention. In addition to performing welding 60 of both the edges on the front and rear ends of the base plate section 49a of the locking capsule 11g as in the construction of the fourth example of this first embodiment, welding 60b is also performed on both the inside edges on the left and right of the open hole 61 that is formed in the center section of the base plate section 49a. The construction and function of the other parts is the same as in the fourth example of this first embodiment.

Embodiment 1

Examples 8 and 9

Figure 20:
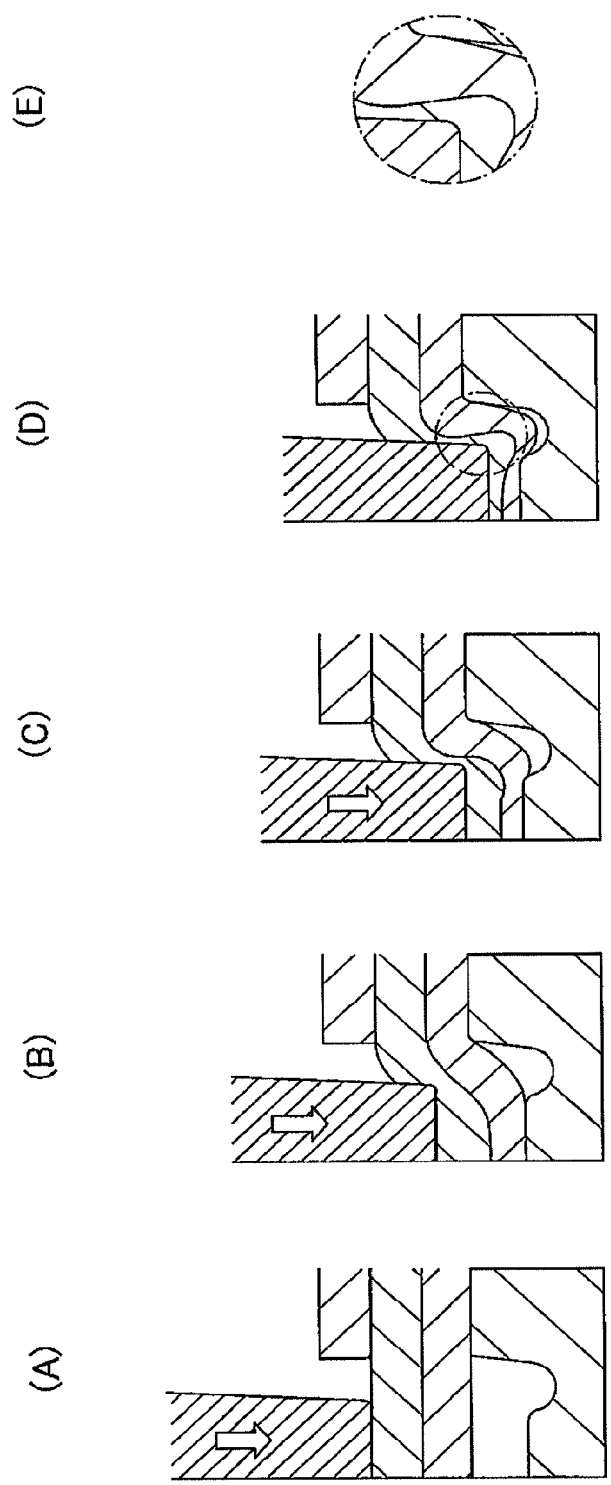
FIGS. 20A to 20D are partial cross-sectional views illustrating the order of processing for connecting and fastening a locking capsule and column-side bracket by clinching in an eighth example of the first embodiment of the present invention.
FIG. 20E is an enlarged cross-sectional view of the major parts in FIG. 20D.
Figure 21:
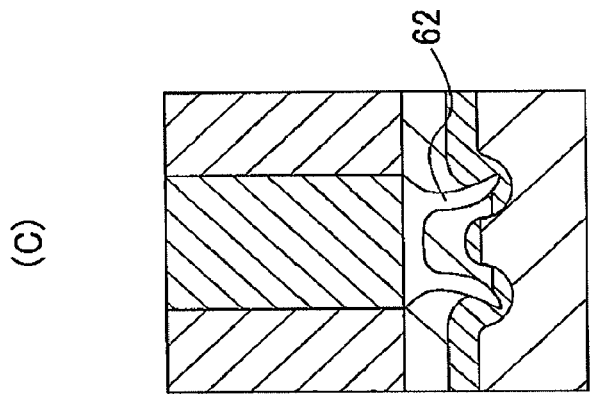
FIGS. 21A to 21C are partial cross-sectional views illustrating the order of processing for connecting and fastening a locking capsule and column-side bracket by a self-piercing rivet in a ninth example of the first embodiment of the present invention.
Figure 21:
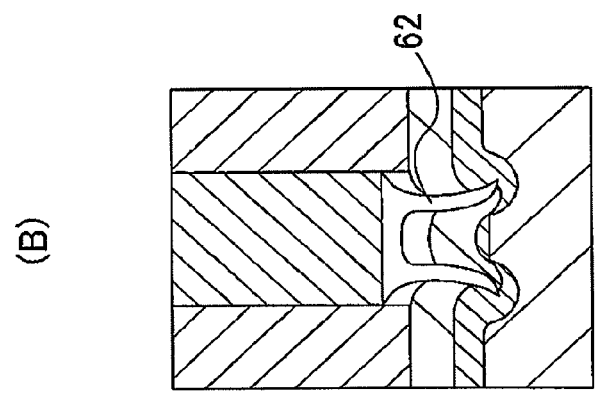
Figure 21:
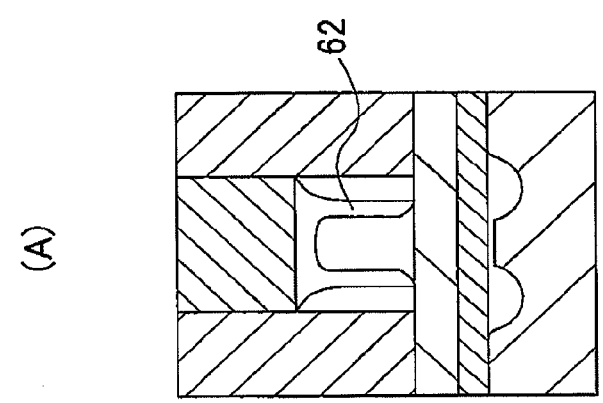
Figure 22:
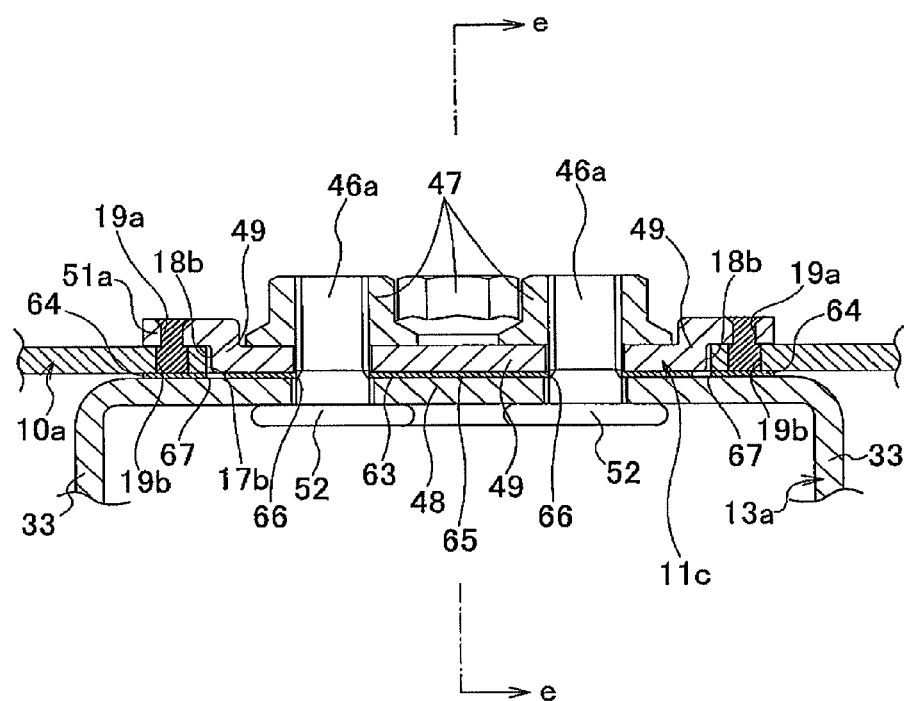
FIG. 22 is a drawing similar to FIG. 4, and illustrates a first example of a second embodiment of the present invention.
Figure 23:
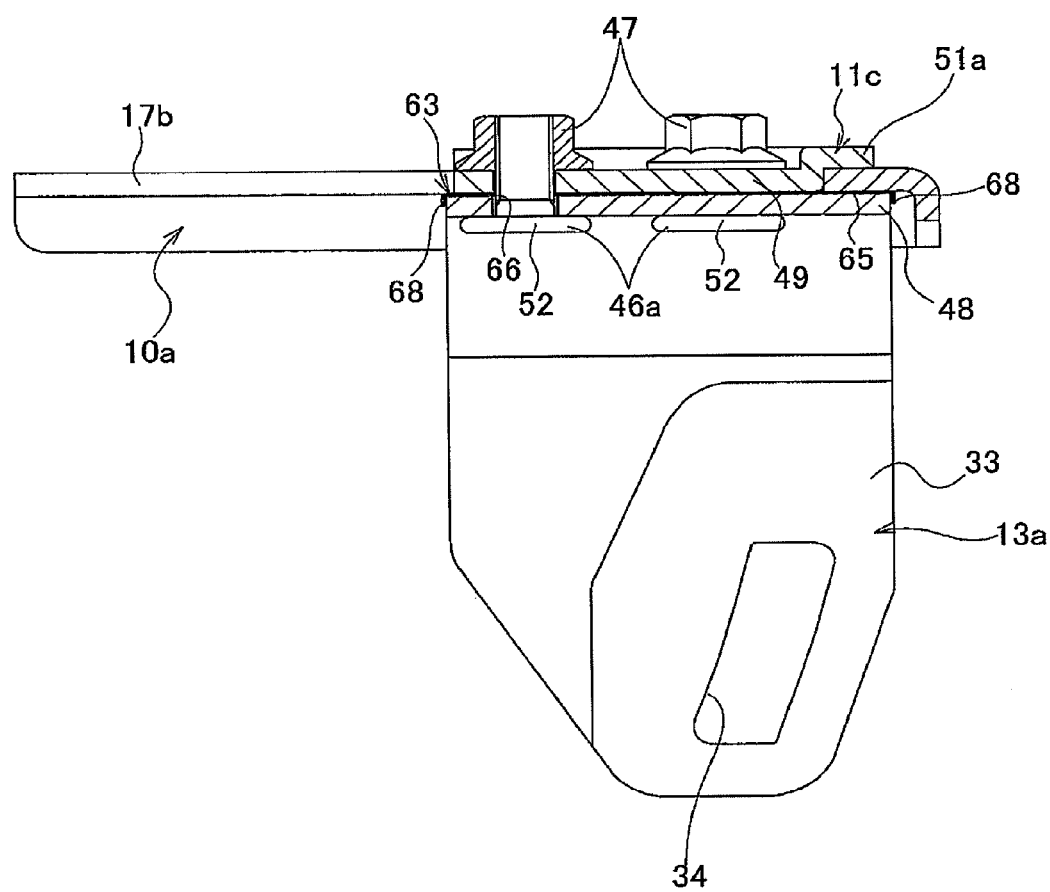
FIG. 23 is a cross-sectional view of section e-e in FIG. 22.

FIG. 20 and FIG. 21 respectively illustrate an eighth and ninth example of the first embodiment of the present invention. In the case of the eighth example illustrated in FIG. 20, the locking capsule is connected and fastened to the top plate section of the column-side bracket by clinching, and in the case of the ninth example illustrated in FIG. 21, they are connected by self-piercing rivets 62. The construction of these examples can also be applied to any one of the first through seventh examples of the first embodiment, and the construction function of the other parts are the same as in the first through seventh examples of the first embodiment.

Embodiment 2

Example 1

FIG. 22 to FIG. 25 illustrate a first example of a second embodiment of the present invention. In the case of each of the example of the first embodiment, depending on the state of formation of the space, a thin film of synthetic resin exists over nearly the entire area between the bottom surface of the vehicle-side bracket and the top surface of top plate section of the column-side bracket and there is a possibility that vehicle-side bracket and column-side bracket will be insulated from each other. From the aspect of eliminating the need to provide separate ground circuits, it can be said to be preferable that the vehicle-side bracket and the column-side bracket be maintained in a conductive as a ground circuit for the various switches that are provided on the column-side bracket (including the steering wheel portion).

In this example, instead of there being synthetic resin between the top surface of the top plate section 48 of the column-side bracket 13a and the both surfaces of the base plate section 49 of the locking capsule 11c and the vehicle-side bracket 10b, a supporting plate structure 63 as illustrated in FIG. 25A to FIG. 25C is held between the surfaces. This supporting plate structure 63 is made using thin metal plate such as stainless spring steel plate or phosphor bronze plate that is anti-corrosive and elastic and having a thickness of 0.5 mm or less (for example, about 0.2 to 0.5 mm), and comprises a pair of a supporting plate sections 64 that function as supporting plates, and an installation plate section 65. Of these, the supporting plate sections 64 have a wave shaped pattern along the forward-backward direction, and have an elastic force in the direction where the thickness (t) in the thickness direction becomes large. Moreover, the installation plate section 65 is a flat plate, and in order to insert bolts 46a for connecting and fastening the column-side bracket 13a and the locking capsule 11c, through holes 66 are formed in a plurality of locations (three locations in this example). Slits 67 are formed in between the edges on the left and right sides of the installation plate section 65 and the pair of supporting plate sections 64 except for the front-end section and rear-end section. In other words, the installation plate section 65 and the pair of supporting plate sections 64 are only connected by the front-end section and the rear end section. Furthermore, the front-end section and rear-end section of the supporting plate sections 64 are bent downward at nearly right angles to form bent locking sections 68.

Figure 24:
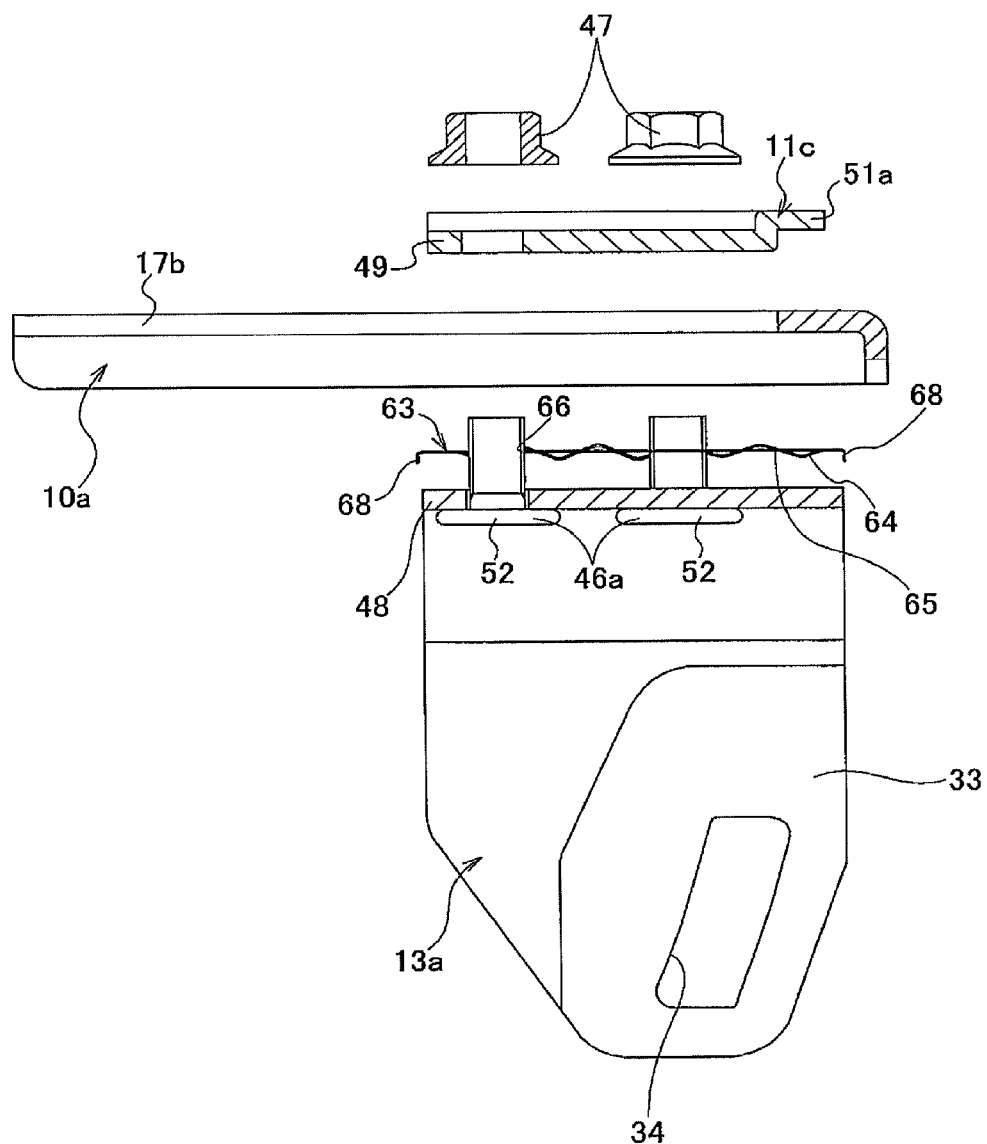
FIG. 24 is a drawing similar to FIG. 23, and illustrates a state during assembly of the first example of the second embodiment.
Figure 25:
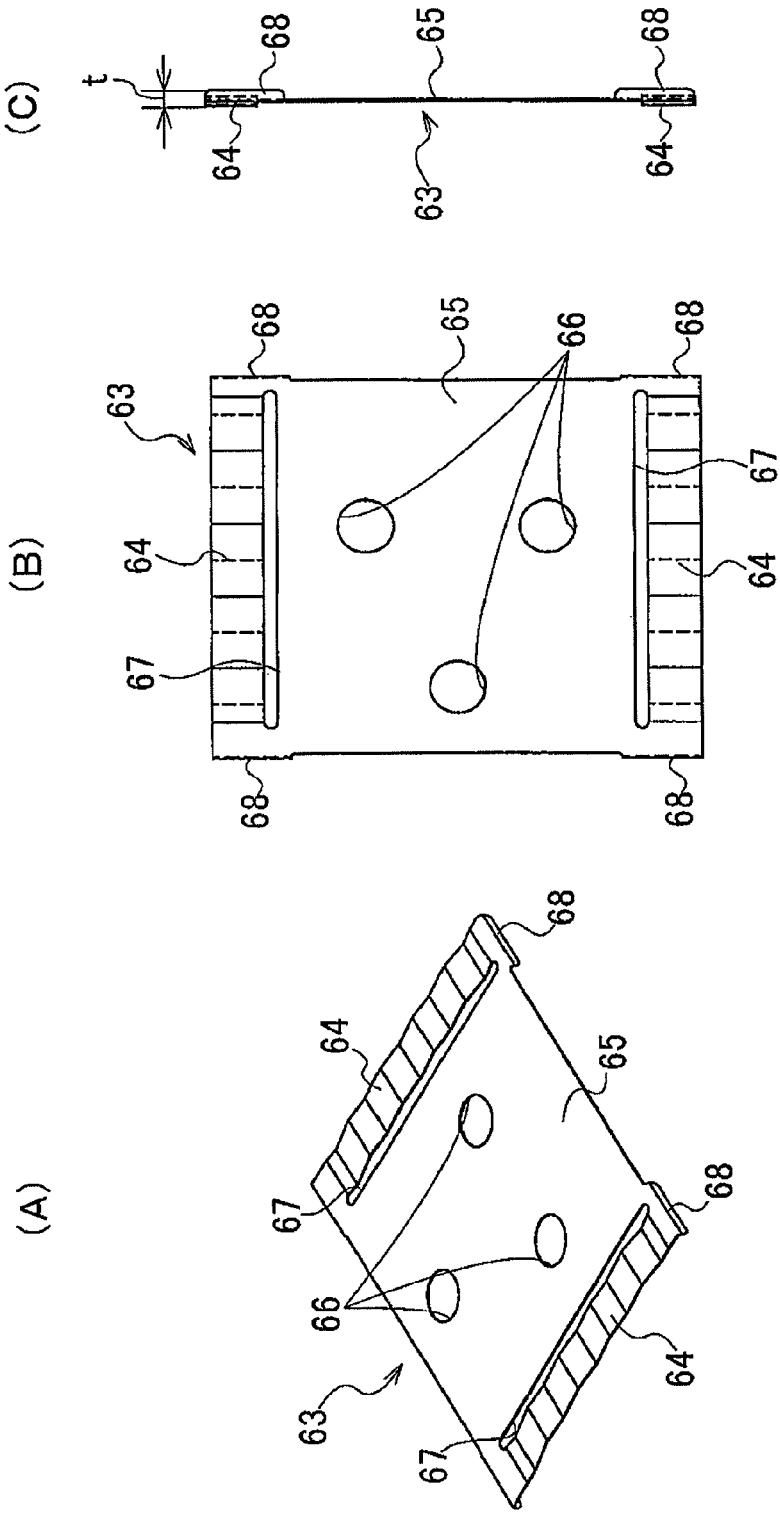
FIG. 25A is a perspective view of a supporting plate structure of the first example of the second embodiment as seen diagonally from above.
FIG. 25B is a top view thereof.
FIG. 25C is an end view as seen from the side in FIG. 25B.

The support apparatus for a steering column of this example is assembled with the supporting plate structure 63 as described above held between the top surface of the top plate section 48 and the bottom surfaces of the base plate section 49 and the vehicle-side bracket 10b. In other words, as illustrated in FIG. 24, the supporting plate structure 63, the vehicle-side bracket 10b and the locking capsule 11c are placed in order from the bottom side on the top surface of the top plate section 48 in which the bolts 46a are arranged. When doing this, the bolts 46a are inserted through the through holes 66 that are formed in the supporting plate structure 63, and the plurality (three locations in this example) of through holes that are formed in the base plate section 49 of the locking capsule 11c. Moreover, the small through holes 19a that are formed in the brim section 51a side of the locking capsule 11c, and the small through holes 19b that are formed in the vehicle-side bracket 10b are aligned. Furthermore, the pair of bent locking sections 68 are made to engage with (come in contact with or closely face) the edges on both the front and rear ends of the top plate section 48. After the top plate section 48, the supporting plate structure 63, the vehicle-side bracket 10b and the locking capsule 11c have been put together as described above, nuts 47 are screwed onto the top end sections of the bolts 46a and tightened.

As these nuts 47 are tightened, the pair of supporting plate sections 64 that are formed on both end sections in the width direction of the supporting plate structure 63 are elastically pressed in between the top surface of both end sections in the width direction of the top plate section 48 and the bottom surface of the vehicle-side bracket 10b. In this state, synthetic resin is injected into the small through holes 19a, 19b by injection molding and solidified, to form locking pins 45a that connect the vehicle-side bracket 10b and the locking capsule 11c. When forming these locking pins 45a, part of the synthetic resin enters into the minute spaces that exist between the locking capsule 11c and the vehicle-side bracket 10b, and between the vehicle-side bracket 10b and the column-side bracket 13a and solidifies. In this state, assembly of the support apparatus for a steering column of this example is complete, and the pair of support plate sections 64 provide support between the top surface of both end sections in the width direction of the top plate section 48 and the bottom surface of the vehicle-side bracket 10b. Moreover, the synthetic resin that is solidified inside the minute space suppresses a lowering of the rigidity due to the minute space. As a result, the rigidity, and particularly the moment rigidity, of the connecting section between the vehicle-side bracket 10b and the column-side bracket 13a is improved.

With the support apparatus for a steering column of this example, it is possible to stabilize and sufficiently increase the support rigidity of the column-side bracket 13a with respect to the vehicle-side bracket 10b, and to ensure a state of electrical conductivity between the vehicle-side bracket 10b and the column-side bracket 13a. In other words, in the case of the support apparatus for a steering column of this example, a pair of supporting plate sections 64 provide support between both end sections of the top surface 48 of the column-side bracket 13a that are sufficiently separated in the width direction and the bottom surface of the vehicle-side bracket 10b. Moreover, the portion of the space that exists between the column-side bracket 13a and the vehicle-side bracket 10b is filled by synthetic resin, so it is possible to suppress a decrease in rigidity of the connecting section between the column-side bracket 13a and the vehicle-side bracket 10b due to the existence of this space. Therefore, it is possible to stabilize and sufficiently increase the support rigidity.

Moreover, the pair of supporting plate sections 64 that are provided on both end sections in the width direction of the supporting plate structure 63 made of metal plate elastically comes in contact with the top surface of the column-side bracket 13a and the bottom surface of the vehicle-side bracket 10b. In other words, the apex sections of the waveform of these support plate sections 64 are strongly pressed against the top surface of the column-side bracket 13a and the bottom surface of the vehicle-side bracket 10b, so are not separated from the top surface of the column-side bracket 13a and the bottom surface of the vehicle-side bracket 10b by the synthetic resin that enters into the minute space during injection molding of the locking pins 45a, and this the column-side bracket 13a and the vehicle-side bracket 10b remain in an electrically conductive state, and it is possible to maintain electrical conduction between the column-side bracket 13a and the vehicle-side bracket 10b.

Embodiment 2

Example 2

Figure 26:
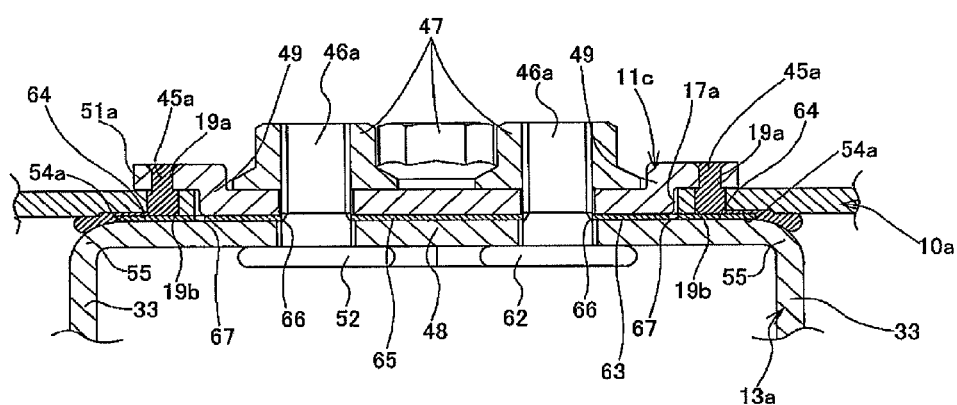
FIG. 26 is a drawing similar to FIG. 4, and illustrates a second example of the second embodiment of the present invention.
Figure 27:
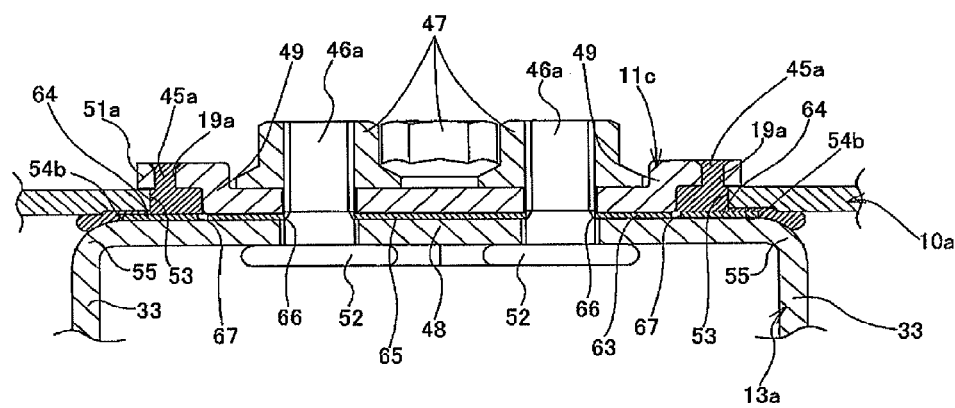
FIG. 27 is a drawing similar to FIG. 6, and illustrates the second example of the second embodiment.
Figure 28:
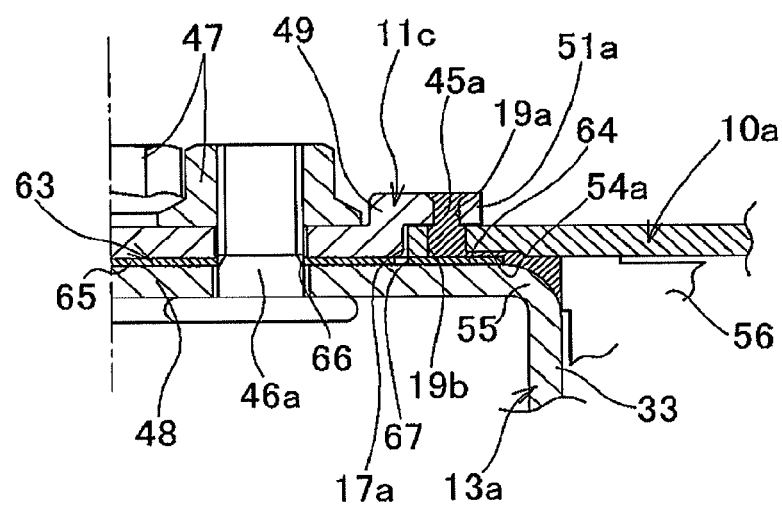
FIG. 28 is a drawing similar to FIG. 8, and illustrates the second example of the second embodiment.
Figure 28:
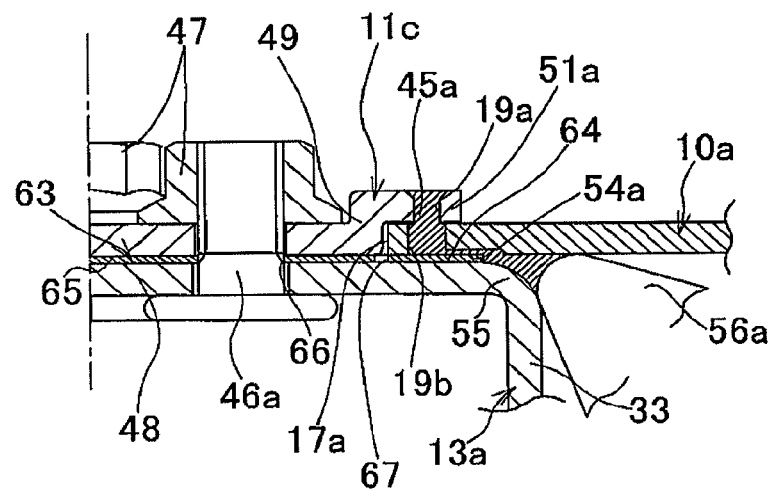

FIG. 26 to FIG. 28 illustrate a second example of the second embodiment of the present invention. This example has construction that combines the construction of the first example of the first embodiment and the first example of the second embodiment. In other words, in order for the locking pins 45a to span between the locking capsule 11c that is fastened to the column-side bracket 13a and the vehicle-side bracket 10a, notch sections 53 are formed in addition to the small through holes 19b as volume sections on the fastening side of the vehicle-side bracket 10a, and concave sections 54a, 54b having one end that is connected with the small through holes 19b or notch sections 53 are formed in the bottom surface of the vehicle-side bracket 10a.

The column-side bracket 13a and the locking capsule 11c are combined in a state as in the first example of the second embodiment where a supporting plate structure 63 is held between the top surface of the top plate section 48 and the bottom surfaces of the base plate section 49 of the locking capsule 11c and the vehicle-side bracket 10a. In this state, the column-side bracket 13a and the locking capsule 11c are connected and fastened by a plurality (three in the example in the figures) of bolts 46a and nuts 47. Furthermore, in this state, the locking capsule 11c and the vehicle-side bracket 10a are connected by locking pins 45a.

Heated and melted thermoplastic synthetic resin for forming the locking pins 45a is injected into these small through holes 19a, 19b and notch sections 53 from the side of the small through holes 19a that are formed in the brim section 51a. This synthetic resin solidifies inside these small through holes 19a, 19b and notch sections 53 to form locking pins 45a, and enters inside the minute space that exists between both the top and bottom surfaces of the supporting plate structure 63 and the bottom surface of the vehicle-side bracket 10a or the top surface of the top plate section 48 and solidifies, thus filling in and blocking much of the minute space. When performing injection molding of the locking pins 45a in this way, as in the first example of the first embodiment, when it is necessary, as shown in FIG. 28(A) and FIG. 28(B), a blocking jib 56, 56a is used to block the opening on the external space side of the space existing between the bottom surface of the vehicle-side bracket 10a and the top surface of the curved section 55, and prevent surplus synthetic resin from flowing through the concave sections 54a, 54b to the external space side and being lost. The construction and function of the other parts are the same as in the first example of the first embodiment and the first example of the second embodiment.

Embodiment 2

Example 3

Figure 29:
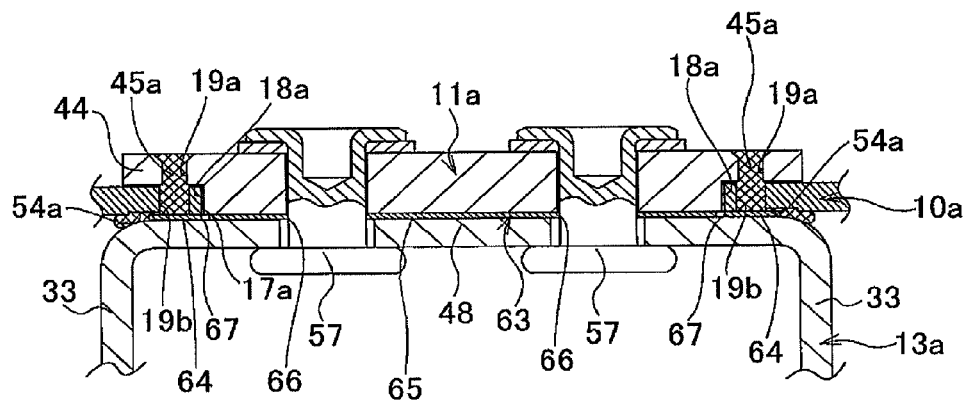
FIG. 29 is a drawing similar to FIG. 4, and illustrates a third example of the second embodiment of the present invention.

FIG. 29 illustrates a third example of the second embodiment of the present invention. This example has construction that combines the second example of the first embodiment and the first example of the second embodiment. In other words, the locking capsule 11a and the column-side bracket 13a are connected by rivets 57 with the supporting plate structure 63 held in between. The construction and function of the other parts are the same as in the second example of the first embodiment, and the first example of the second embodiment.

Embodiment 2

Example 4

Figure 30:
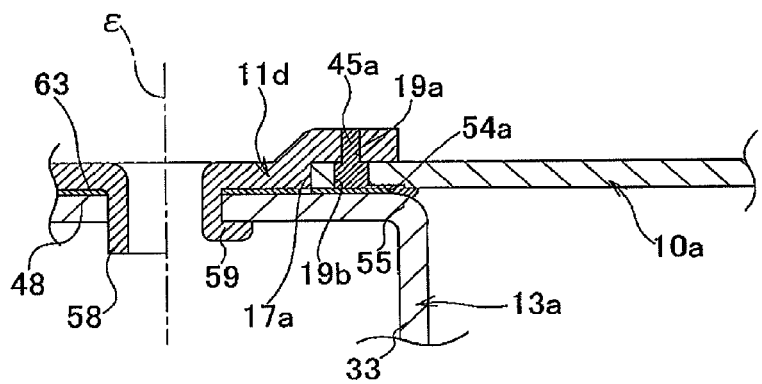
FIG. 30 is a cross-sectional view corresponding to the right in FIG. 4, and illustrates a fourth example of the second embodiment of the present invention.
Figure 31:
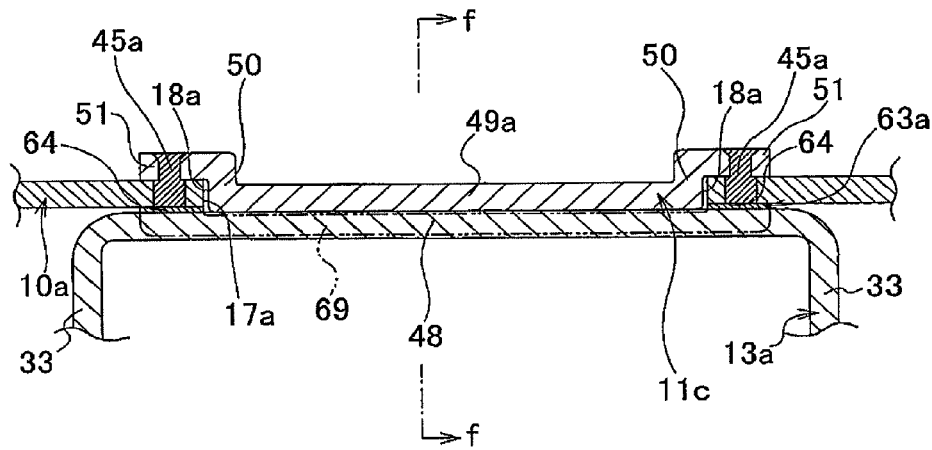
FIG. 31 is a drawing similar to FIG. 4, and illustrates a fifth example of the second embodiment of the present invention.
Figure 32:
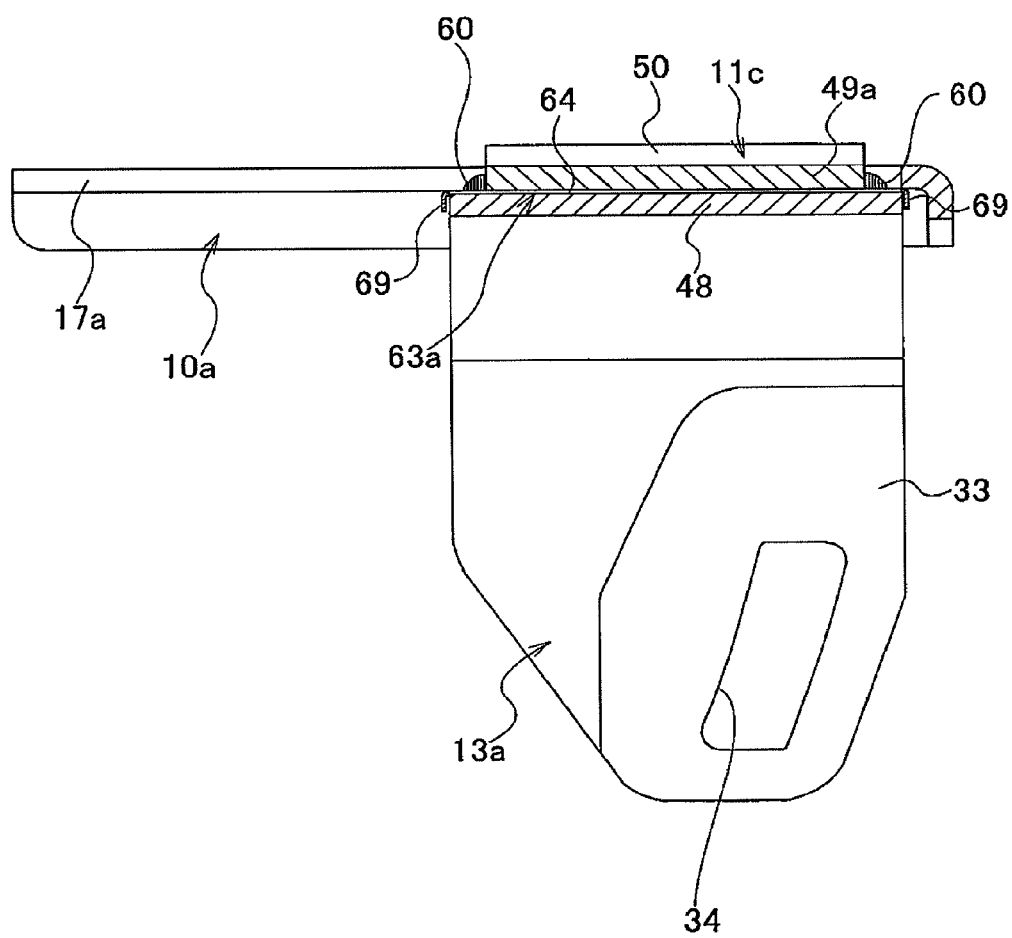
FIG. 32 is a cross-sectional view of section f-f in FIG. 31.
Figure 33:
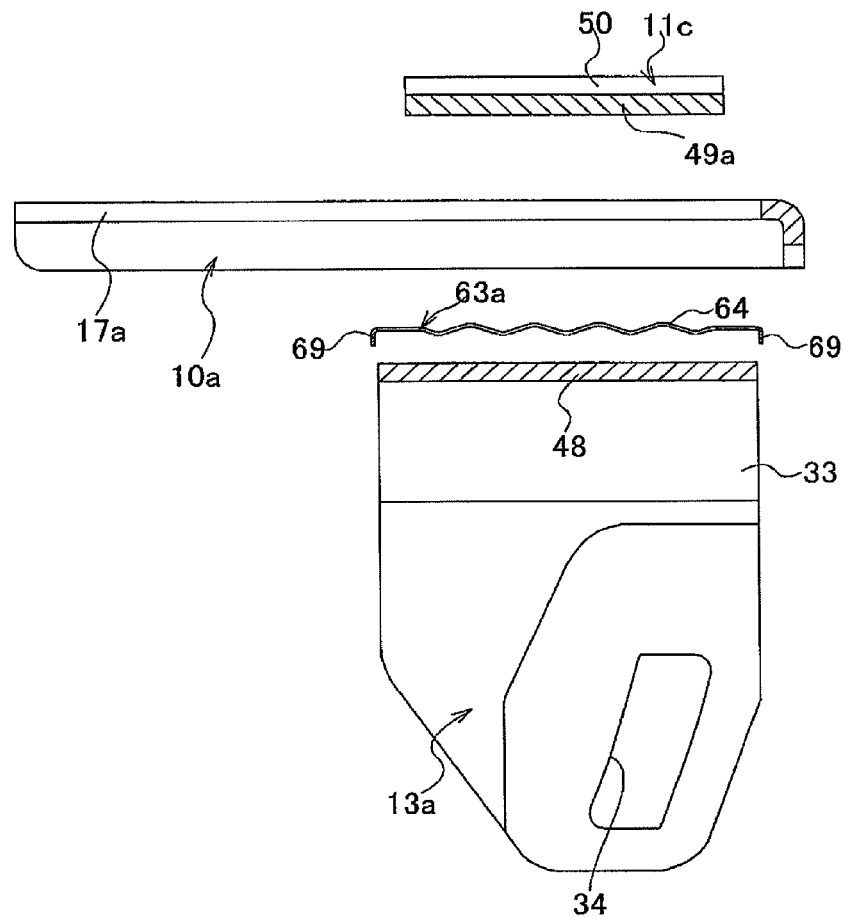
FIG. 33 is a drawing similar to FIG. 32, and illustrates a state during assembly of the fifth example of the second embodiment.

FIG. 30 illustrates a fourth example of the second embodiment of the present invention. This example has construction that is a combination of the third example of the first embodiment and the first example of the second embodiment. In other words, the locking capsule 11d and the column-side bracket 13a are connected and fastened together by a crimped section 59 (portion on the right side of the chain line ϵ in FIG. 30) that is formed by plastically deforming the portion near the tip end of a cylindrical section 58 (portion the left side of the chain line ϵ in FIG. 30) that is formed by burring toward the outside in the radial direction, with the supporting plate structure 63 held in between. The construction and function of the other parts are the same as in the third example of the first embodiment and the first example of the second embodiment.

Embodiment 2

Example 5

Figure 34:
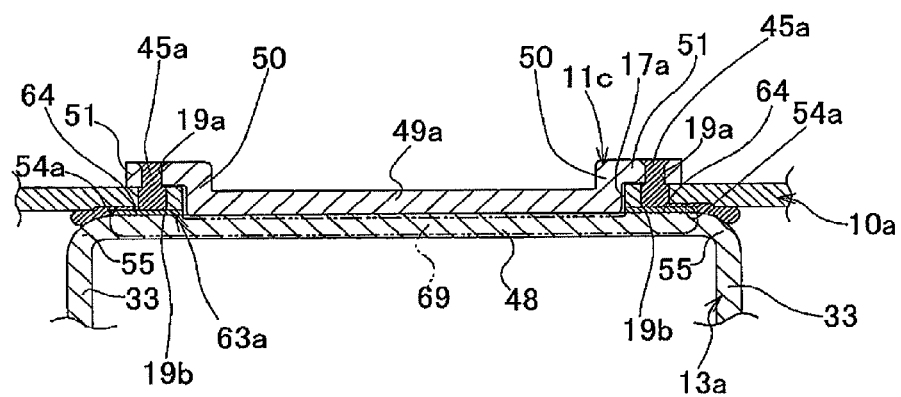
FIG. 34 is a drawing similar to FIG. 4, and illustrates the fifth example of the second embodiment.
Figure 35:
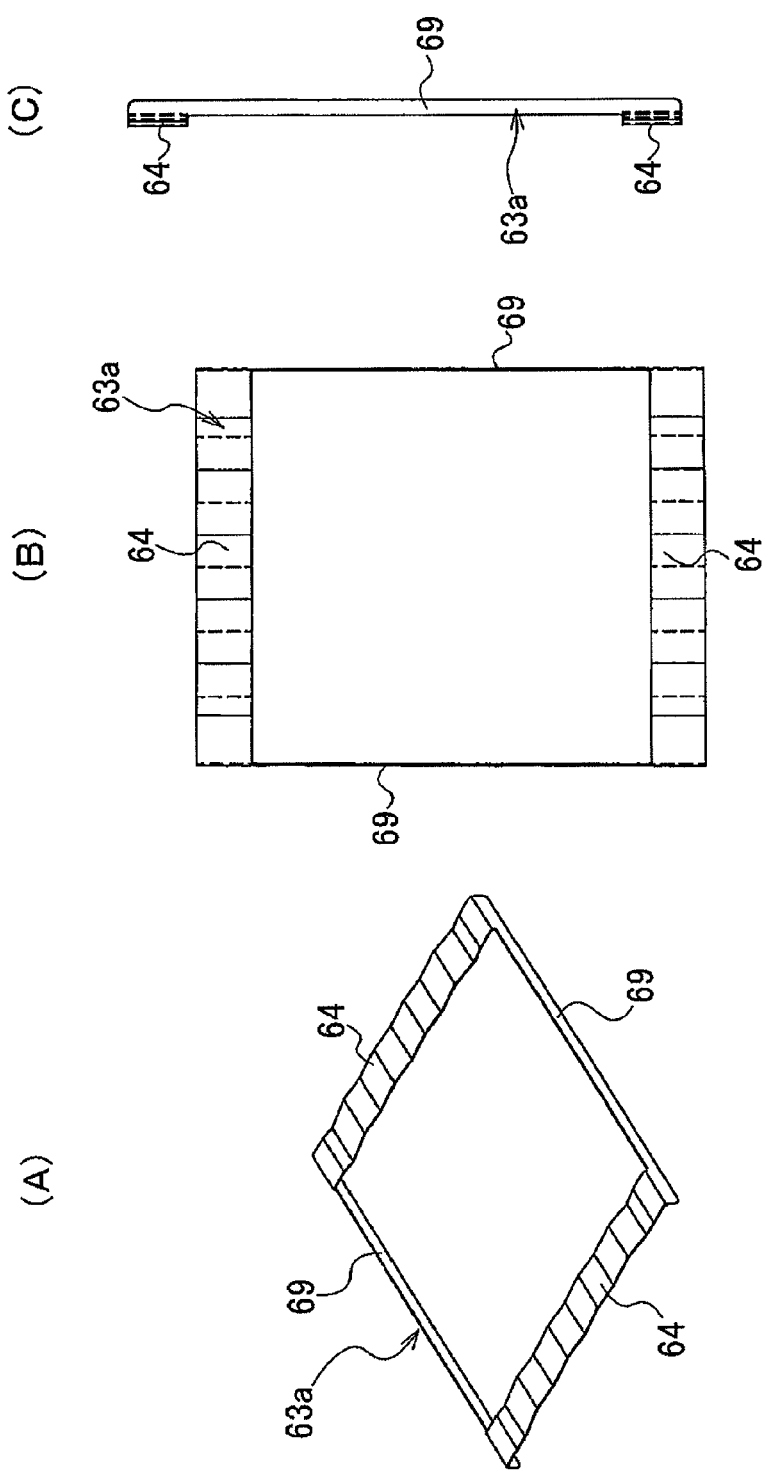
FIG. 35A is a perspective view of a protruding plate structure of the fifth example of the second embodiment as seen diagonally from above.
FIG. 35B is a top view.
FIG. 35C is an end view as seen from the side in FIG. 35B.

FIG. 31 to FIG. 35 illustrate a fifth example of the second embodiment of the present invention. In this example, a supporting plate structure 63, having a pair of left and right supporting plate sections 64, is assembled in construction where the locking capsule 11c and the column-side bracket 13a are connected by welding. As illustrated in FIG. 35, a square shaped plate is used as the supporting plate structure 63a that is made up elastic metal plate, and the front-end sections and rear-end sections of a pair of left and right supporting plate sections 64 are connected by connecting sections 69 that are bent downward at right angles with respect to these supporting plate sections 64.

As illustrated in FIG. 34, in the case of assembling the construction of this example, the supporting plate structure 63a, the vehicle-side bracket 10a and the locking capsule 11c are placed in order from the bottom side on the top surface of the top plate section 48 of the column-side bracket 13a. In this state, the front and rear connecting sections 69 fit with (come in contact with or closely faces) the edges on the front and rear ends of the top plate section 48. With the pair of left and right supporting plate sections 64 being pressed, the locking capsule 11c is pressed toward the top plate section 48, and in this state, the base plate section 49a of the locking capsule 11c and the top plate section 48 are connected and fastened by welding 60. After that, synthetic resin is fed in between small through holes 19a and small through holes 19b that are formed in portions of the brim section 51 of the locking capsule 11c and the vehicle-side bracket 10a and that are aligned with each other to form locking pins 45a. In this state, the column-side bracket 13a is connected to the vehicle-side bracket 10a so as to be able to break away toward the front due to an impact load during a secondary collision. Except that the construction of the connecting section between the column-side bracket 13a and the locking capsule 11c is different, and the shape of the supporting plate structure 62a is made to be different in order to correspond to that construction of that connecting section, the construction and function of the other parts are the same as in the first example of the second embodiment.

The explanation above was for the case wherein the present invention is applied to construction for connecting the vehicle-side bracket and column-side bracket by way of a locking capsule that is provided at only one location in the center section of the brackets. However, the present invention can also be applied to construction for connecting the vehicle-side bracket and column-side bracket by a pair of locking capsules that are provided at two locations in the portion near both ends in the width direction of the brackets. Moreover, the surface where the concave sections are formed for allowing the locking pins to flow out to the external space side, instead of being the bottom surface of the vehicle-side bracket, or together with being the bottom surface of the vehicle-side bracket, could be the top surface of the top plate section of the column-side bracket.

Moreover, even in the state where the dimension in the forward-backward direction of the vehicle-side bracket is increased and a secondary collision advances, it is possible to prevent the support force for supporting the steering column by the vehicle-side bracket from being lost. In this case, as long as it is possible to sufficiently maintain the length in the forward-backward direction of the vehicle-side bracket, it is possible for the locking notch for engagement with the locking capsule to not have to be open on the front-end edge of the vehicle-side bracket. In other words, the locking notch of the present invention also includes a through hole that is not open on the front-end edge of the vehicle-side bracket.

Embodiment 3

Example 1

The support apparatus for a steering column of the present invention is not only effective in stabilizing and sufficiently increasing the support rigidity of the column-side bracket with respect to the vehicle-side bracket, but is also effective in making it possible to more smoothly start displacement in the forward direction of the column-side bracket during a secondary collision in order to more completely protect the operator during the secondary collision.

Figure 36:
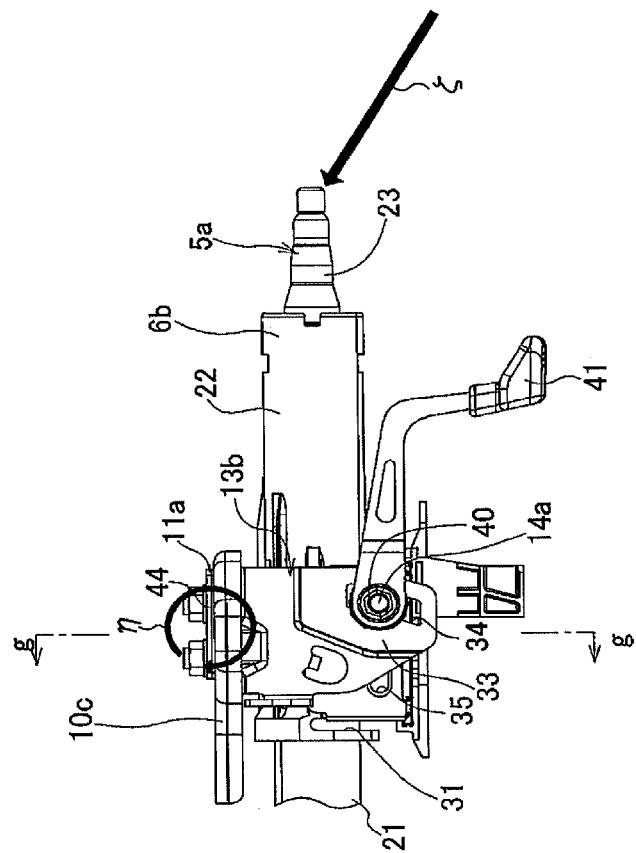
FIG. 36 is a side view for explaining the state when a moment is applied to the column-side bracket and locking capsule during a secondary collision in connection with a third embodiment of the present invention.
Figure 37:
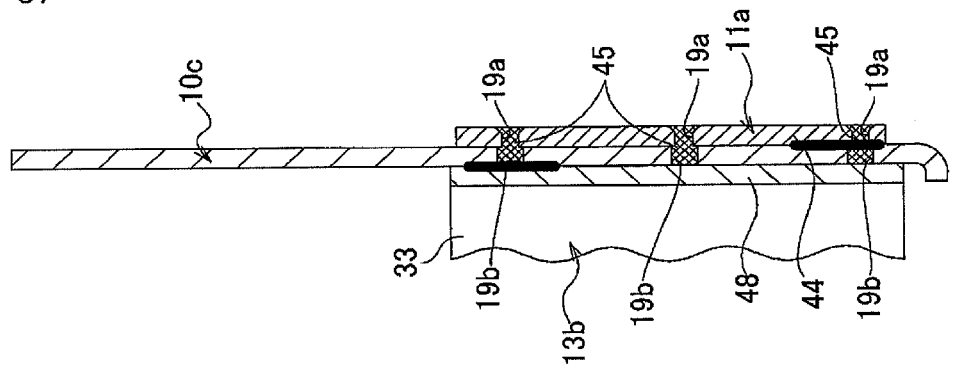
FIG. 37 is a cross-sectional view of section g-g in FIG. 36, and is for explaining about the locations of the engagement sections among the vehicle-side bracket, column-side bracket and locking capsule where surface pressure becomes high due to the moment in connection with the third embodiment of the present invention.

Improvements for keeping the break away load necessary for starting displacement low is explained using FIG. 36 and FIG. 37. During a secondary collision, an impact load in the forward direction is applied to the outer column 22 of the steering column 6b by way of the steering shaft 5 as illustrated by arrow $\xi$ in FIG. 36. This impact load is input to the column-side bracket 13b from the area of engagement between the adjustment rod 14a and the long hole 34 in the up-down direction. As a result, a moment in the clockwise direction is applied to the column-side bracket 13b as illustrated by the arrow $\eta$ in FIG. 36. Even though the direction in which this impact load acts is in the horizontal forward direction, the steering column 6b is inclined such that the front side is low and the rear side is high. Therefore, the impact load that is input to the column-side bracket 13b from the area of engagement between the adjustment rod 14a and the long hole 34 in the up-down direction is decreased due to the amount that the steering column 6b is inclined (partial force in the axial direction of the steering column).

In any case, during a secondary collision, the column-side bracket 13b is pressed in the forward direction while receiving the moment indicated by the arrow $\eta$, and breaks away in the forward direction from the vehicle-side bracket 10c. During this break away process, rubbing occurs between both the top and bottom surface of the portions on both sides of the locking notch 17a (see FIG. 1) of the vehicle-side bracket 10c, the bottom surface of the flange section 44 (or brim section 51, 51a) of the locking capsule 11a, and the top surface of the top plate section 48 of the column-side bracket 13b. In order to keep the break away load low, it is necessary to keep the friction force due to this rubbing low. Incidentally, during a secondary collision, when a moment such as indicated by arrow $\eta$ is applied to the column-side bracket 13b, the surface pressure at the area of contact indicated by the bold line in FIG. 37 between the portion near the front of the top surface of the top plate section 48 and the bottom surface of the vehicle-side bracket 10c, and the area of contact between the bottom surface of the flange section 44 (or brim section 51, 51a) and the top surface of the vehicle-side bracket 10c becomes high. As a result, in that state, the friction force due to rubbing becomes large, and there is a tendency for the break away load to become large, which is disadvantageous from the aspect of protecting the operator during a collision accident.

Figure 38:
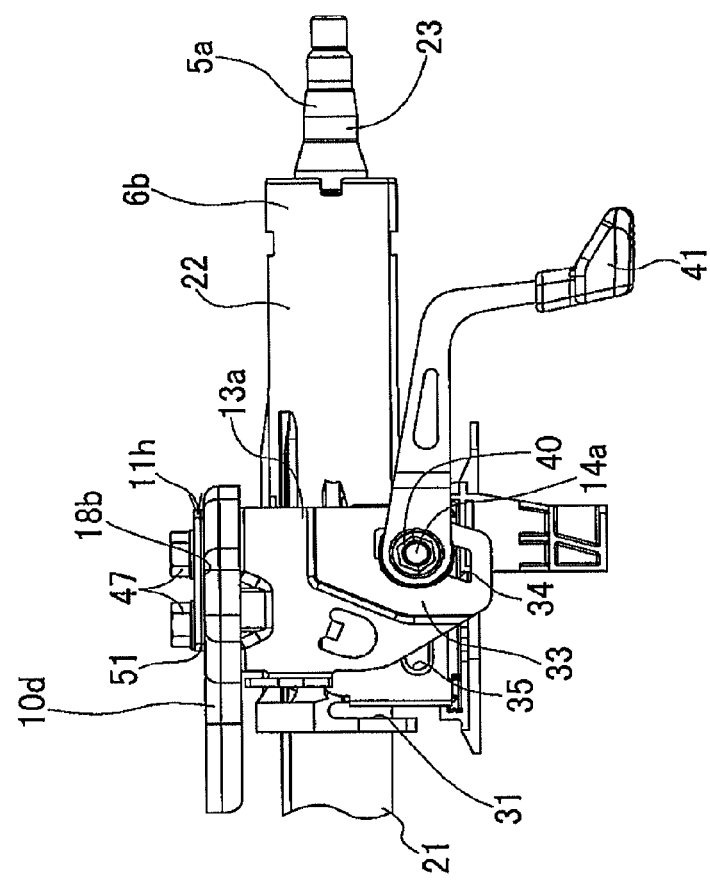
FIG. 38 is a side view illustrating a first example of the third embodiment of the present invention.
Figure 39:
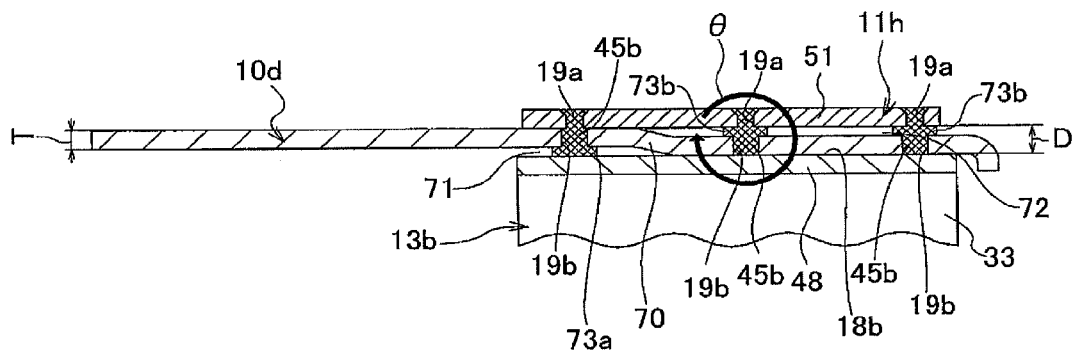
FIG. 39 is a drawing similar to FIG. 37, and illustrates the first example of the third embodiment.

FIG. 38 and FIG. 39 illustrate a first example of a third embodiment of the present invention. A feature of this third embodiment of the present invention, including this example, is construction wherein synthetic resin having a low coefficient of friction stably intervenes in the portions where contact pressure becomes high during a secondary collision in order to keep the break away load for allowing forward displacement of the column-side bracket during a secondary collision low. The construction of the other parts is the same as the construction in any of the examples of the first and second embodiments of the present invention. Therefore, drawings and explanations of equivalent parts will be omitted or simplified, such that the explanation below centers on the features of this example.

In this example, the distance between the top and bottom surfaces of the portions on both side of the locking notch 17a (see FIG. 1) of the vehicle-side bracket, and the top surface of the top plate section 48 of the column-side bracket and the bottom surface of the brim section 51 of the locking capsule is different in some place. Therefore, in this example, the space (D) between the top surface of the top plate section 48 and the bottom surface of the brim section 51 is sufficiently larger (for example, about 0.3 mm to 2 mm, and preferably 0.5 mm to 1 mm larger) than the thickness dimension (T) of the metal plate of the vehicle-side bracket 10d. A stepped section 70 is formed in the portion in the middle section in the forward-backward direction of the metal plate of the vehicle-side bracket 10d that is between the top surface of the top plate section 48 and the bottom surface of the brim section 51. The vehicle-side bracket 10d is such that the portion that is further toward the front side than the stepped section 70 is above the portion that is further toward the rear side (portion near the bottom surface of the brim section 51).

In the state where the portion of the vehicle-side bracket 10d on both side of the locking notch 17a (see FIG. 1) are inserted into locking groove 18b between the top surface of the top plate section 48 and the bottom surface of the brim section 51, in regards to the portion of the top plate section 48 that is further on the front side than the stepped section 70, the top surface of the vehicle-side bracket 10d comes in contact with the bottom surface of the brim section 51, and the bottom surface of the vehicle-side bracket 10d is separated from the top surface of the top plate section 48 such that a space 71 on the front bottom side exists between these surfaces. On the other hand, in regards to the portion of the top plate section 48 that is further on the rear side than the stepped section 70, the bottom surface of the vehicle-side bracket 10d comes in contact with the top surface of the top plate section 48, and the top surface of the vehicle-side bracket 10d is separated from the bottom surface of the brim section 51 such that a space 72 on the rear top side exists between these surfaces.

In this example, when the column-side bracket 13b and the locking capsule 11h are connected and fastened by bolts and nuts 47, the column-side bracket 13b and locking capsule 11h are combined with the vehicle-side bracket 10d by way of synthetic resin locking pins 45b so as to be able to break away due to an impact load during a secondary collision. These locking pins 45b are formed by injection molding by injecting melted thermoplastic synthetic resin into small through holes 19a and small through holes 19b that are formed in portions of the locking capsule 11h and the vehicle-side bracket 10d that are aligned with each other and allowed to solidify. During the injection molding, part of this synthetic resin enters inside the space 71 on the front bottom side and the space 72 on the rear top side, and forms plate sections 73a, 73b in the portions of the space 71 on the front bottom side and the space 72 on the rear top side that surround the portions that are not connected with the small through holes 19a and small through holes 19b.

In this example, the inclination angle of the steering column 6b is small, and the adjustment rod 14a is located in the portion near the bottom of the column-side bracket 13b. Therefore, during a secondary collision, a moment is applied to the column-side bracket 13b in a direction that raises the portion near the front of the top plate section 48 and lowers the portion near the middle section and rear section of the top plate section 48. Therefore, the portions where the plate sections 73a, 73b are formed become portions where the contact pressure between the top and bottom surfaces of the vehicle-side bracket 10d and the opposing surface, which is the top surface of the top plate section 48 or the bottom surface of the brim section 51 becomes high.

As described above, in the case of the support apparatus for a steering column of this example, it is possible to have synthetic plate section 73a, 73b stably intervene in the portions where contact pressure becomes high due to a moment that acts on the column-side bracket 13b during a secondary collision. In other words, by forming a stepped section 70 in the middle section of the vehicle-side bracket 10d, a space 71 on the front bottom side and a space 72 on the rear top side are provided and have thickness dimensions that allow for synthetic resin to penetrate into the portions where the plate sections 73a, 73b are to be formed. Therefore, it is possible to certainly form plate sections 73a, 73b having sufficient thickness dimensions in the portions where the contact pressure becomes high. As a result, it is possible to prevent rubbing between the metal surfaces of the top and bottom surfaces of the vehicle-side bracket 10d and the opposing surfaces. The plate sections 73a, 73b are made of synthetic resin such as a polyamide resin or polyacetal resin that have a coefficient of friction even lower than metal, so even though contact pressure increases due to a moment that occurs during a secondary collision, it is possible for the column-side bracket 13b and the locking capsule 11h to break away smoothly in the forward direction from the vehicle-side bracket 10d. As a result, it is possible to keep impact (peak load) that is applied to the body of the operator at the instant that a secondary collision occurs low, and to more easily and completely protect the operator during a collision accident.

The space 71 on the front bottom side has sufficient height, so the synthetic resin plate section 73a can certainly be formed. In this space 71 on the front bottom side, the synthetic resin plate section 73a is elastically held between the top surface of the portion near the front of the top plate section 48 of the column-side bracket 13b and the bottom surface of the vehicle-side bracket 10d. Moreover, the space 72 on the rear top side also has sufficient height, so the synthetic resin plate section 73b can certainly be formed. In this space 72 on the rear top side, the synthetic resin plate section 73b is elastically held between the bottom surface of the locking capsule 11h and the top surface of the vehicle-side bracket 10d, and this synthetic resin plate section 73b presses the vehicle-side bracket 10d against the portion near the middle section and near the rear of the top plate section 48 of the column-side bracket 13b so that no space occurs between the bottom surface of the vehicle-side bracket 10d and the top surface of the middle section and near rear of the top plate section 48 of the column-side bracket 13b. Therefore, it is possible to suppress displacement of the vehicle-side bracket 10d and the column-side bracket 13b due to minute space that exists between the opposing surfaces. This example can also be additionally applied to the construction of each of the examples of the first embodiment and second embodiment, and can also be alternatively employed.

Embodiment 3

Example 2

Figure 40:
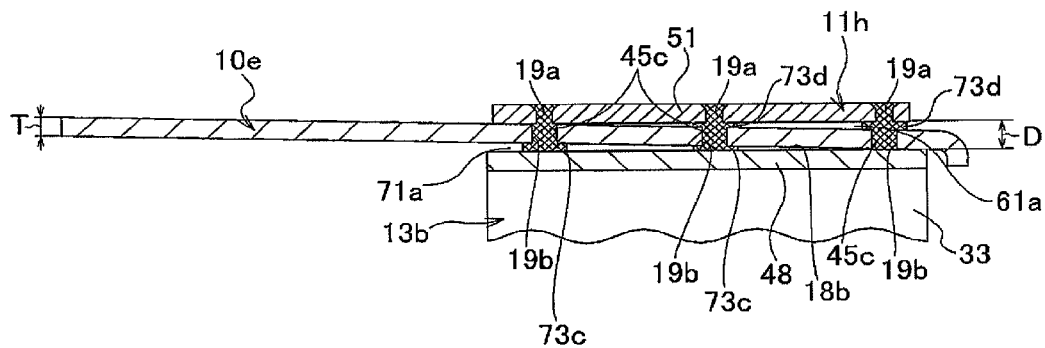
FIG. 40 is a drawing similar to FIG. 37, and illustrates a second example of the third embodiment of the present invention.

FIG. 40 illustrates a second example of the third embodiment of the present invention. In this example as well, as in the first example of the third embodiment, the space (D)

between the top surface of the top plate section 48 of the column-side bracket 13b and the bottom surface of the brim section 51 that is provided on the locking capsule 11h is sufficiently greater than the thickness dimension (T) of the metal plate of the vehicle-side bracket 10e. However, in this example, different from the case of the first example of the third embodiment, the portion of the metal plate on both sides of the locking notch 17a (see FIG. 1) of the vehicle-side bracket 10e that is inserted between the top surface of the top plate section 48 and the bottom surface of the brim section 51 is flat and does not have a stepped section.

Particularly, in this example, the metal plate of the vehicle-side bracket 10e is located in the space between the top surface of the top plate section 48 and the bottom surface of the brim section 51 and is inclined with respect to these top and bottom surfaces. Therefore, a wedge shaped space 71a on the front bottom side that inclines in a direction such that the thickness direction becomes greater going toward the front is formed between the top surface of the top plate section 48 and the bottom surface of the vehicle-side bracket 10e. On the other hand, a wedge shaped space 72a on the rear top side that inclines in a direction such that the thickness dimension becomes greater going toward the rear is formed between the top surface of the vehicle-side bracket 10e and the bottom surface of the brim section 51.

Due to the existence of this kind of space 71a, 72a, when performing injection molding of synthetic resin in the small through holes 19a and small through holes 19b that are formed in portions of the vehicle-side bracket 10e and brim section 51 that are aligned with each other, locking pins 45c are formed, and at the same time, wedge shaped plate sections 73c, 73d are formed in the space between the top surface of the top plate section 48 and the bottom surface of the brim section 51 such that the thickness direction of each gradually changes along the forward-backward direction. In this example as well, during a secondary collision, a moment is applied to the column-side bracket 13b in a direction that raises the portion near the front of the top plate section 48 and lowers the portion near the middle section and rear of the top plate section 48. The plate sections 73c, 73d that have sufficient thickness dimensions are located in the portion where the contract pressure due to the moment becomes high, so during a secondary collision, it is possible for the column-side bracket 13b and locking capsule 11e to smoothly break away in the forward direction from the vehicle-side bracket 10e. The construction and function of the other parts are the same as in the first example of the third embodiment.

Embodiment 3

Example 3

Figure 41:
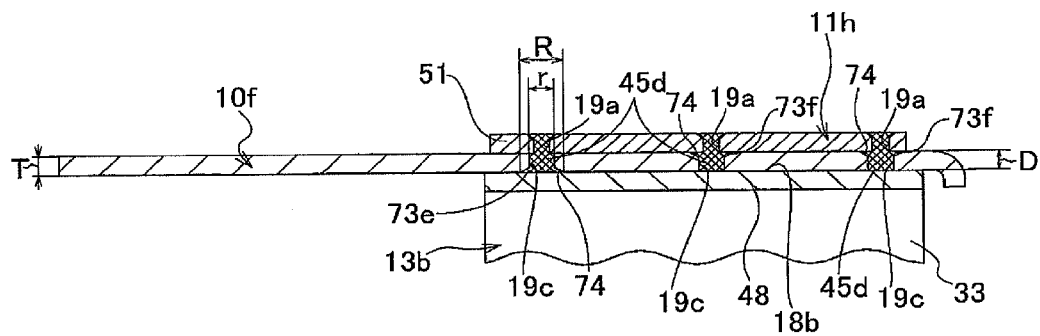
FIG. 41 is a drawing similar to FIG. 37, and illustrates a third example of the third embodiment of the present invention.
Figure 42:
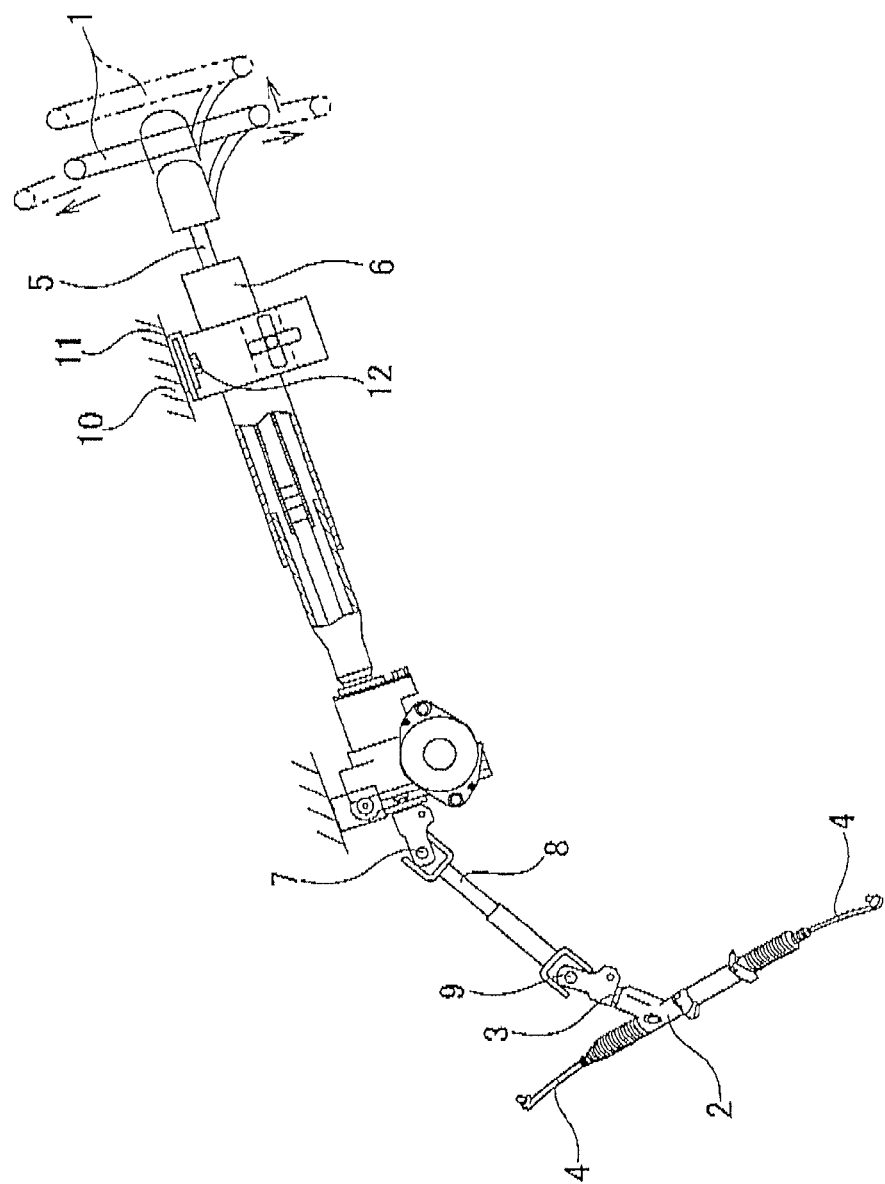
FIG. 42 is a partial cross-sectional view, and illustrates an example conventionally known support apparatus for a steering column.
Figure 43:
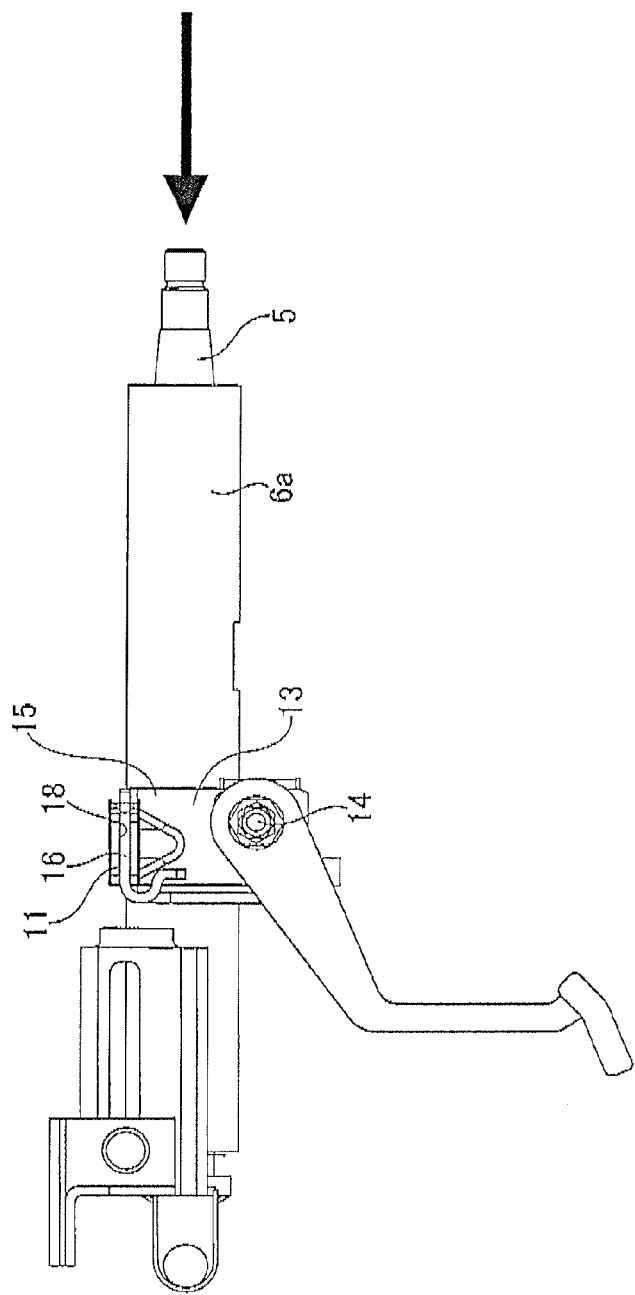
FIG. 43 is a side view that illustrates an example of a conventional apparatus is more detail.

FIG. 41 illustrates a third example of the third embodiment of the present invention. In this example, differing from the first example and second example of the third embodiment, the space (D) between the top surface of the top plate section 48 of the column-side bracket and the bottom surface of the brim section 51 formed on the locking capsule 11h is nearly the same as the thickness dimension (T) of the metal plate of the vehicle-side bracket 10f (D≈T). In other words, the space (D) between the top surface of the top plate section 48 and the bottom surface of the brim section 51 is the dimension which allows for the portion on both sides of the locking notch 17a (see FIG. 1) of part of the vehicle-side bracket 10f to fit with these surfaces without backlash movement (opposing surfaces come in contact over the entire surface).

Corresponding to this, in this example, in a plurality of small through holes 19c that are formed in the portions on both side of the locking notch 17a on part of the vehicle-side bracket 10f and apart from each other in the forward-backward direction, circular concave sections 74 are formed in the opening sections on the bottom end of the small through holes 19c on the front-end section, and in the opening sections on the top end of the small through holes 19c of the middle section and rear-end section. These concave sections 74 are such that the inner-diameter side connects with the small through holes 19c, and the diameter (R) of these concave sections 74 is sufficiently greater than the inner diameter (r) of these small through holes 19c (R>>r). Therefore, when locking pins 45d are formed in the small through holes 19c and the small through holes 19a that are formed in the brim section 51 of the locking capsule 11h by injection molding using synthetic resin, part of the synthetic resin flows into the concave sections 74 and becomes solidified to form plate sections 73e, 73f. In this example as well, the plate sections 73e, 73f exist in portions where the contact pressure due to a moment that is applied to the column-side bracket 13b during a secondary collision becomes high, so it is possible for the column-side bracket 13b and the locking capsule 11h to smoothly break away toward the front from the vehicle-side bracket 10f.

In the explanation above, the case was explained in which the present invention is applied to construction wherein the vehicle-side bracket and the column-side bracket are connected by way of a locking capsule that is provided at only one location in the center section in the width direction of the brackets. However, any of the embodiments of the present invention can also be applied to construction wherein the vehicle-side bracket and column-side bracket are connected by way of a pair of locking capsules 11 that are provided at two locations in portions near both ends in the width direction of these brackets. In the case where the locking capsule in this construction is made of a metal such as an aluminum alloy, together with being able to stably improve the support rigidity of the column-side bracket with respect to the vehicle-side bracket, it is possible to reduce the break away load during a secondary collision by employing the construction of this third embodiment.

In this third embodiment, the angel of inclination of the steering column is large, and depending on the design parameters of the steering column, such as the installation location of the adjustment rod being near the rear with respect to the installation location of the locking capsule, there is a possibility that the direction of the moment that is applied to the column-side bracket during a secondary collision will be opposite that of the example in the figures (counterclockwise direction in FIGS. 38 to 41). In such a case, the synthetic resin plate sections for reducing friction are provided on the opposite side from the case illustrated in FIG. 39 to FIG. 41.

Furthermore, in the third embodiment, the synthetic resin of the plate sections can be oleoresin in which lubrication oil is mixed into the synthetic resin, or a coating layer made of a low-friction material can be formed on the surfaces that face the top and bottom surfaces of the vehicle-side bracket by way of the plate sections. With this kind of construction, it is possible to further reduce the break away load of the column-side bracket during a secondary collision, and thus more completely protect the operator during a collision accident.

EXPLANATION OF REFERENCE NUMBERS

1 Steering wheel
2 Steering gear unit
3 Input shaft
4 Tie rod
5, 5a Steering shaft
6, 6a, 6b Steering column
7 Universal joint
8 Intermediate shaft
9 Universal joint
10, 10a to 10f Vehicle-side bracket
11, 11a to 11h Locking capsule
12 Bolt or stud
13, 13a, 13b Column-side bracket
14, 14a Adjustment rod
15 Support plate section
16 Installation plate section
17, 17a, 17b Locking notch
18, 18a, 18b Locking groove
19, 19a to 19c Small through hole
20 Through hole
21 Inner column
22 Outer column
23 Outer shaft
24 Ball bearing
25 Housing
26 Electric motor
27 Controller
28 Support cylinder
29 Center hole
30 Slit
31 Through hole in the circumferential direction
32 Supported plate section
33 Supporting plate section
34 Long hole in the up-down direction
35 Long hole in the forward-backward direction
36 Head section
37 Nut
38 Driving cam
39 Driven cam
40 Cam apparatus
41 Adjustment lever
42 Friction plate unit
43 Installation hole
44 Flange section
45, 45a to 45c Locking pin
46, 46a Bolt
47 Nut
48 Top plate section
49, 49a Base plate section
50 Raised section
51, 51a Brim section
52 Head section
53 Notch section
54a, 54b Concave section
55 Curved section
56, 56a Blocking tool
57 Rivet
58 Cylindrical section
59 Crimped section
60, 60a, 60b Weld
61 Open hole
62 Self-piercing rivet
63, 63a Supporting plate structure
64 Supporting plate section
65 Installation plate section
66 Through hole
67 Slit
68 Bent locking section
69 Connecting section
70 Stepped section
71, 71a Space on the front bottom side
72, 72a Space on the rear top side
73a to 73f Plate section
74 Concave section

What is claimed is:

1. A support apparatus for a steering column comprising:
a column-side bracket that comprises a top surface, and that is supported by the steering column for supporting a steering shaft on the inside thereof so as to be able to rotate freely, so as to displace in the forward direction together with the steering column during a secondary collision;
a vehicle-side bracket that comprises: a bottom surface that comes in contact with or closely faces the top surface, a locking notch that extends in the axial direction of the steering column, and a plurality of fixed side volume sections that are provided on a perimeter edge section around the locking notch; and that is supported by and fastened to the vehicle body side, so as not to displace in the forward direction even during the secondary collision;
a locking capsule that together with being locked in the locking notch, comprises: end sections on both ends in the width direction that are located on the top side of the perimeter edge section of the vehicle-side bracket, and a plurality of displacing side volume sections that are located so as to be aligned with the fixed side volume sections; and that is fastened to the column-side bracket so as to displace in the forward direction together with the column-side bracket during the secondary collision;
a plurality of connecting members that are made of synthetic resin that spans between the fixed side volume sections to the displacing side volume section, and that shear off due to an impact load that is applied during the secondary collision; and
concave sections that are formed on at least one of the bottom surface of the vehicle-side bracket and the top surface of the column-side bracket, so as to extend on a portion where the bottom surface of the vehicle-side bracket faces the top surface of the column-side bracket, and together with one end thereof connecting to the fixed side volume sections, the other end thereof being open to an external space side, and into which part of the synthetic resin enters;
by holding the perimeter edge section of the vehicle-side bracket by the top surface of the column-side bracket and both end sections in the width direction of the locking capsule, the column-side bracket being supported by the vehicle-side bracket so as to be able to break away in the forward direction due to an impact load that is applied during the secondary collision.

2. The support apparatus for the steering column according to claim 1, wherein the synthetic resin that enters the concave sections is exposed to the external space side.

3. The steering apparatus for the steering column according to claim 1, wherein at least part of the fixed side volume sections are notch sections that are open on the inner edge of the locking notch, and part of the synthetic resin that is fed to that notch sections for forming the connecting members enters between the inner edge of the locking notch and the portion of the locking capsule that face that inner edge of the locking notch.

4. The support apparatus for the steering column according to claim 1, further comprising at least two supporting plates that are made of a metal plate having elasticity and that are held in at least two locations between the bottom surface of the vehicle-side bracket and the top surface of the column-side bracket that are separated in the width direction, in a state where the dimension in the thickness direction is elastically contracted.

5. The support apparatus for the steering column according to claim 4, wherein the supporting plates are connected by connecting sections on the front-end sections and the rear-end section so as to have integrated construction.

6. A manufacturing method for the support apparatus for the steering column according to claim 1, comprising the steps of:
- pressing a blocking tool against a joining section of the bottom surface of the vehicle-side bracket and the top surface of the column-side bracket so as to block openings on the external space side of the concave sections and deform at least one of the brackets elastically in a direction that separates the top surface of the column-side bracket and the bottom surface of the vehicle-side bracket;
- injecting synthetic resin into the displacing side volume sections and the fixed side volume sections; and
- moving the blocking tool out of the way such that the part of the synthetic resin is elastically held between the bottom surface of the vehicle-side bracket and the top surface of the column-side bracket.

* * * * *